Aug. 18, 1953   J. G. VINCENT   2,648,992
TRANSMISSION
Filed July 17, 1947   11 Sheets-Sheet 1

INVENTOR.
Jesse G Vincent
BY
ATTORNEY.

Aug. 18, 1953  J. G. VINCENT  2,648,992
TRANSMISSION
Filed July 17, 1947  11 Sheets-Sheet 2

INVENTOR.
Jesse G. Vincent
BY
Milton Tibbetts
ATTORNEY.

Aug. 18, 1953 J. G. VINCENT 2,648,992
TRANSMISSION
Filed July 17, 1947 11 Sheets-Sheet 3

INVENTOR.
Jesse G. Vincent
BY
ATTORNEY.

1ST SPEED

3RD SPEED

4TH SPEED

KICKDOWN

Aug. 18, 1953     J. G. VINCENT     2,648,992
TRANSMISSION
Filed July 17, 1947     11 Sheets-Sheet 9

GEARED HILL BRAKING

INVENTOR.
Jesse G. Vincent
BY
ATTORNEY.

PUSH START

Aug. 18, 1953   J. G. VINCENT   2,648,992
TRANSMISSION
Filed July 17, 1947   11 Sheets-Sheet 11

INVENTOR.
Jesse G. Vincent
BY
ATTORNEY.

Patented Aug. 18, 1953

2,648,992

UNITED STATES PATENT OFFICE 2,648,992

TRANSMISSION

Jesse G. Vincent, Grosse Pointe Park, Mich., assignor to Packard Motor Car Company, Detroit, Mich., a corporation of Michigan Application July 17, 1947, Serial No. 761,475

20 Claims. (Cl. 74—472)

This invention relates to transmissions, and more particularly to an improved transmission capable of automatically varying the speed ratio of the drive in accordance with variations of vehicle speed and engine torque.

An object of this invention is to provide a transmission having successively engaging friction clutches driving through low and high range gearing wherein automatically operable means are provided to control engagement of the clutches and the high range gearing to provide an improved four speed transmission.

A further object of the invention resides in the provision of a transmission having successively operable low and high speed ranges, each range having a plurality of different ratios to provide a large number of different speeds with a minimum number of parts.

Another object of the invention is to provide an improved four speed transmission wherein automatically operable means are provided to control successive engagement of spaced friction clutches driving through successively operable low and high range gearing.

Still another object of the invention is to provide a control mechanism for a multi-speed ratio vehicle transmission having successively operable clutches wherein a master valve is provided with a piston urged toward a position to engage higher speed ratio clutches by fluid pressure responsive to vehicle speed, and wherein a spring tensioned by throttle opening movement of an accelerator pedal is provided to delay movement of the piston in the clutch engaging direction in proportion to accelerator pedal position.

A further object resides in the provision of an improved control mechanism for a vehicle transmission having a plurality of clutches driving through successively acting low range gearing and clutch engaged high range gearing wherein fluid pressure, responsive to vehicle speed and influenced by torque supplied to drive the vehicle, is employed to control successive engagement of said clutches, and fluid pressure, responsive to torque supplied by the engine, is employed to successively engage said clutches.

Other objects of this invention will appear in the following description and appended claims reference being had to the accompanying drawings forming a part of this specification wherein like reference characters designate corresponding parts in the several views.

Fig. 2a is a diagrammatic view illustrating the operation of the forward and reverse selector lever.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
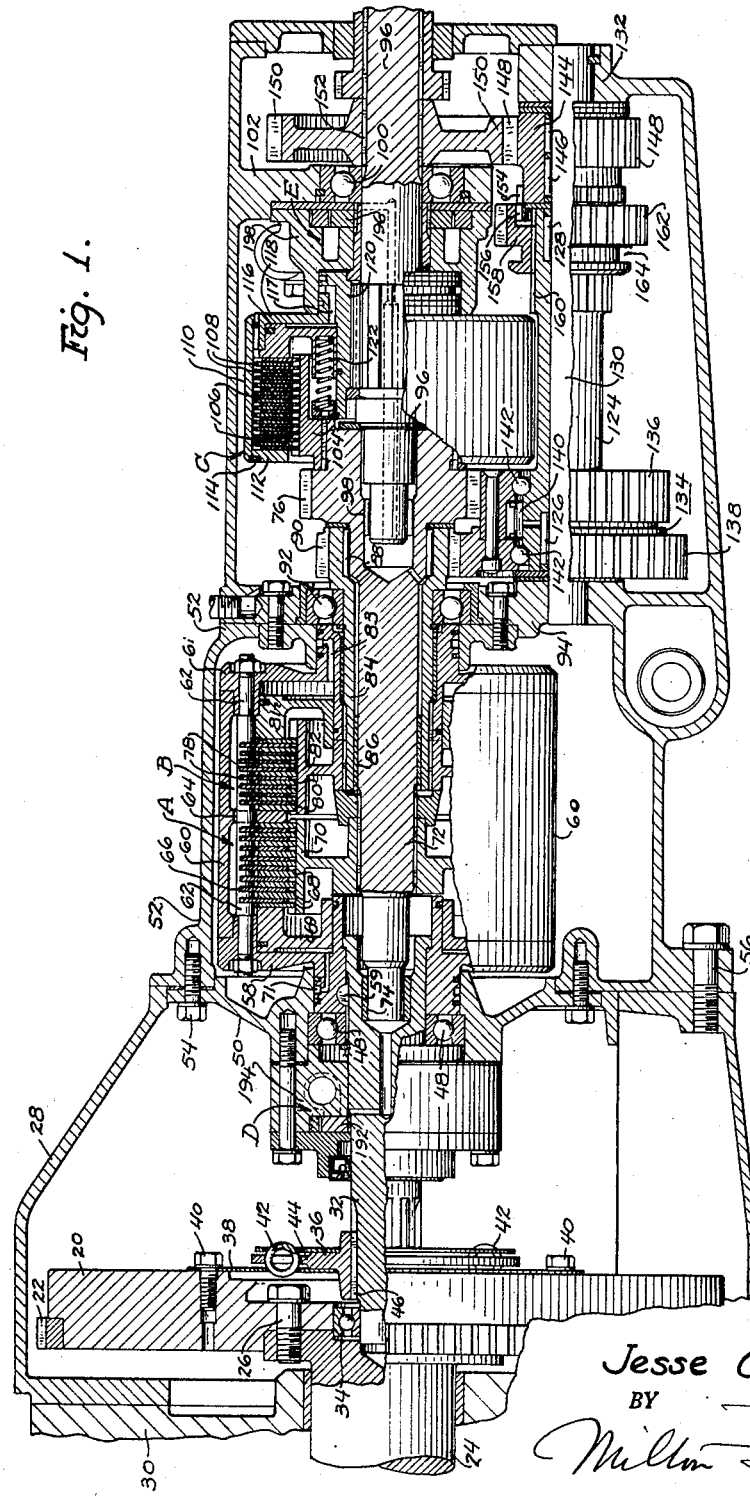
Fig. 1 is a longitudinal sectional view of a transmission embodying my invention.

Referring now more particularly to Fig. 1 it will be noted that a flywheel 20 having a starter gear 22 is secured to the driving shaft or crankshaft 24 of a prime mover in any convenient manner as by studs 26. The flywheel 20 is housed within a casing 28 secured to the engine block or other portion 30 of the prime mover.

A clutch driving shaft 32 has its forward end journalled in a bearing 34 mounted in the flywheel 20 and is yieldingly connected to the flywheel through a hub 36. A disk 38 secured to the flywheel 20 as by studs 40 is drivingly connected through a plurality of circumferentially spaced springs 42 to a flange 44 of the hub 36 splined to the clutch driving shaft 32 as illustrated at 46.

The other end of the clutch driving shaft 32 is journalled in a bearing 48 positioned in a cover 50 secured to a casing 52 by studs 54. The casing 52 is secured to the casing 28 as by studs 56 and extends rearwardly therefrom to house the transmission mechanism.

The clutch driving shaft 32 is keyed as at 59 to a flanged member 58, which is connected to a clutch housing 60. A member 61 which is symmetrical with the member 58 is positioned at the other end of the housing 60, bolts 62 being provided to secure the members 58 and 61 to the housing 60. The housing 60 is provided with a central abutment 64 dividing the space therein to receive a front clutch A and a rear clutch B. The front clutch A has a plurality of driving friction disks 66 keyed to the housing 60 to transmit a drive to driven friction disks 68 keyed to a hub 70 splined to a centrally disposed shaft 72. The front clutch A is engaged by a ring type piston 69 by fluid under pressure supplied through a port 71 to engage the driving disks 66 with the driven disks 68 between the abutment 64 and the piston 69. The shaft 72 has its forward end journalled in a bearing 74 concentrically mounted in the rear end of the clutch driving shaft 32, and carries a gear 76 adjacent its rear end.

The rear clutch B has a plurality of driving friction disks 78 keyed to the housing 60 to transmit a drive to driven friction disks 80 keyed to a hub 82 splined to a sleeve shaft 84 surrounding the centrally disposed shaft 72. The rear clutch B is engaged by a ring type piston 81 actuated by fluid under pressure supplied through a port 83 to engage the driving disks 78 with the driven disks 80 between the abutment 64 and the piston 81. The sleeve shaft 84 is concentrically mounted on the shaft 72 through bearings 86 and 88, and has a gear 90 positioned at its rear end, adjacent the gear 76 carried by the shaft 72. The rear end of the sleeve shaft 84 is journalled in a bearing 92 positioned in an inwardly extending web 94 of the casing 52.

A final driven shaft 96 has its forward end journalled in a bearing 98 concentrically mounted in the shaft 72 driven by the front clutch A, and is journalled adjacent its rear end in a bearing 100 positioned in an inwardly extended web 102 of the casing 52.

A range controlling mechanism is provided to vary the speed ratio of the drive transmitted through the rear and front clutches B and A respectively. For example, a clutch C is provided to direct torque from the engine through the low range gearing when the clutch C is disengaged to provide the first and second speed ratio drives, and to direct torque from the engine through the high range gearing when the clutch C is engaged to provide the third and fourth speed ratio drives.

The high range clutch C is interposed between the shaft 72 driven by the front clutch A and the final driven shaft 96. A hub 104 splined to the rear end of the shaft 72 is provided with a plurality of friction driving disks 106 keyed thereon and adapted to engage driven disks 108 keyed to a housing 110. A backing plate 112 keyed to the housing 110 and restrained against axial displacement therein by a snap ring 114 forms an abutment for one end of the friction disks, and a ring type piston 116 adapted to be actuated hydraulically by fluid introduced through a port 117 is interposed between the other end of the friction disks and a flange 118 of the housing 110 to urge the clutch disks into driving engagement with each other. A hub 120 of the flange 118 is splined to the final driven shaft 96 to interconnect the shaft 72 driven by the front clutch A with the final driven shaft 96 when the high range clutch C is engaged. Yielding means such for example as coiled springs 122 are provided to urge the piston 116 toward the clutch releasing position.

A layshaft sleeve 124 is rotatably mounted through spaced bearings 126 and 128 on a spindle 130 having its forward end secured in the wall 94 of the casing 52, and having its rear end secured in an inwardly extended wall 132 of the casing. A compound gear 134 having spaced gears 136 and 138 meshing with the gears 76 and 90 driven by the front and rear clutches A and B respectively is mounted on the sleeve 124. A one-way driving clutch 140 is interposed between the compound gear 134 and the sleeve 124 to transmit a drive from either of the gears 76 or 90 to the sleeve 124, and to permit the compound gear 134 to overrun the sleeve 124 on the bearings 142 under certain conditions of operation.

A hub 144 mounted on the spindle 130 through spaced bearings 146 adjacent the rear end of the sleeve 124 is provided with a gear 148 meshing with a gear 150 splined to the final driven shaft 96 as illustrated at 152. The hub 144 is provided with dental teeth 154 spaced forwardly of the gear 148 to be engaged by internal dental teeth 156 of a coupler 158 slidably mounted on splines 160 on the sleeve 124. The coupler 158 is provided with a gear 162 to engage a conventional idler gear (not shown) of a reverse gear train to rotate the final driven shaft 96 in the reverse direction when the coupler 158 is shifted forwardly on the splines 160. The coupler 158 has a groove 164 to receive a shifter fork 166 as illustrated in Fig. 2a to move the coupler axially on the splines 160 of the sleeve 124 to engage the dental teeth 156 with the teeth 154 to effect forward drive, or to engage the gear 162 of the coupler with the idler gear of the reverse gear train to effect the reverse drive.

As illustrated in Fig. 2a the shifter fork 166 is carried by a rod 168 slidable axially in spaced supports 170. The rod 168 may be actuated by a lever 172 pivotally mounted on a stud 174, and having one of its ends 175 rounded to project into a slot 176 in the rod 168. The lever 172 may be actuated by a link 177 connected to one arm of a bell-crank 178 having its other arm connected through a link 179 with an arm 180 secured to a rod 181 extending along a steering post column 182 and having a lever 183 positioned adjacent a steering wheel 184.

A spring pressed plunger 185 adapted to project into spaced notches 186, 187 or 188 is provided to releasably hold the rod 168 in the forward, neutral or reverse drive positions to prevent unintentional movement of the coupler 158. A switch 189 connected in series with the circuit of the engine starting motor is provided with a plunger 190 adapted to be engaged by a cam surface 191 to prevent the starting motor from operating except when the coupler 158 is in the neutral position.

Means driven by the clutch driving shaft 32 and by the final driven shaft 96 are provided to supply fluid, such as oil, under pressure to actuate the front and rear clutches A and B and the high range clutch C, and to cooperate with other elements as hereinafter described to control the engagement and release of the clutches.

A front pump D having an impeller 192 splined to the clutch driving shaft 32 and a stator 194 secured to the stationary cover 50 is provided to supply fluid under pressure proportionate to driving shaft speed. A rear pump E having an impeller 196 splined to the final driven shaft 96 and a stator 198 secured to the web 102 of the casing is provided to supply fluid under pressure proportionate to the speed of the final driven shaft 96.

This transmission functions to provide four forward speeds. The first and second speed ratio drives are effected by successively engaging the rear and front clutches B and A with the high range clutch C disengaged, and the third and fourth speed ratio drives are effected by successively engaging the rear and front clutches B and A with the high range clutch C engaged.

To start the engine the operator shifts the lever 183 to the neutral position illustrated in Fig. 2a thereby disengaging the coupler 158 from the forwardly driving dental teeth 154 and the reverse gear train. With the shifter lever 183 in the neutral position the cam 191 on the rod 188 engages the plunger 190 of the switch 189 to complete the electric circuit to the starting motor. The starter button is then actuated to start the engine, and when the engine is running the front pump D supplies fluid under pressure to engage the clutches A, B and C as hereinafter described.

To effect the first speed ratio drive in the forward direction the lever 183 is moved to the forward drive position to shift the coupler 158 rearwardly to engage its dental teeth 156 with the teeth 154 of the hub 144 connected with the final driven shaft 96 through the gears 148 and 150. With the high range clutch C disengaged and the rear clutch B engaged torque from the engine is directed from the crankshaft 24 and flywheel 20 through the spring drive mechanism 42 to the clutch driving shaft 32. Rotation of the shaft 32 is transmitted through the clutch housing 60, driving disks 78 and driven disks 80 of the rear clutch B and hub 82 to the sleeve shaft 84 to drive gear 90. The gear 90 drives the gear 138, and power is transmitted through the one-way clutch 140 to the sleeve 124, coupler 158, internal teeth 156, dental teeth 154 and gear 148 to the gear 150 secured to the final driven shaft 96 to rotate the final driven shaft at a relatively slow speed ratio.

To engage the second speed ratio drive the high range clutch C remains disengaged. The rear clutch B is disengaged and the front clutch A is engaged as hereinafter described. The drive is then transmitted from the clutch driving shaft 32 and clutch housing 60 through the clutch plates 66 and 68 of the front clutch A, hub 70 to the centrally disposed shaft 72, gears 76 and 136, one-way clutch 140 to rotate the sleeve shaft 124 to drive the final driven shaft 96 at a higher speed ratio.

To engage the third speed drive, the high range clutch C is engaged, the front clutch A is released and the rear clutch B is engaged. Power then flows through the sleeve shaft 84, gears 90 and 138, through gear 136 and 76, driving and driven disks 106 and 108 of the high range clutch C, flange 118 and hub 120 to the final driven shaft 96.

To engage the fourth speed ratio or direct drive, the high range clutch C remains engaged, the rear clutch B is disengaged and the front clutch A is engaged whereupon power flows through the shaft 72 driven by the front clutch A, high range clutch C to the final driven shaft 96 to provide a direct drive.

Means are provided to automatically control the engagement and disengagement of the front and rear clutches A, B and the high range clutch C in response to variations of vehicle speed and power supplied by the engine, or expressed another way to vary the speed ratio of the transmission by speed and torque responsive means.

Figure 2:
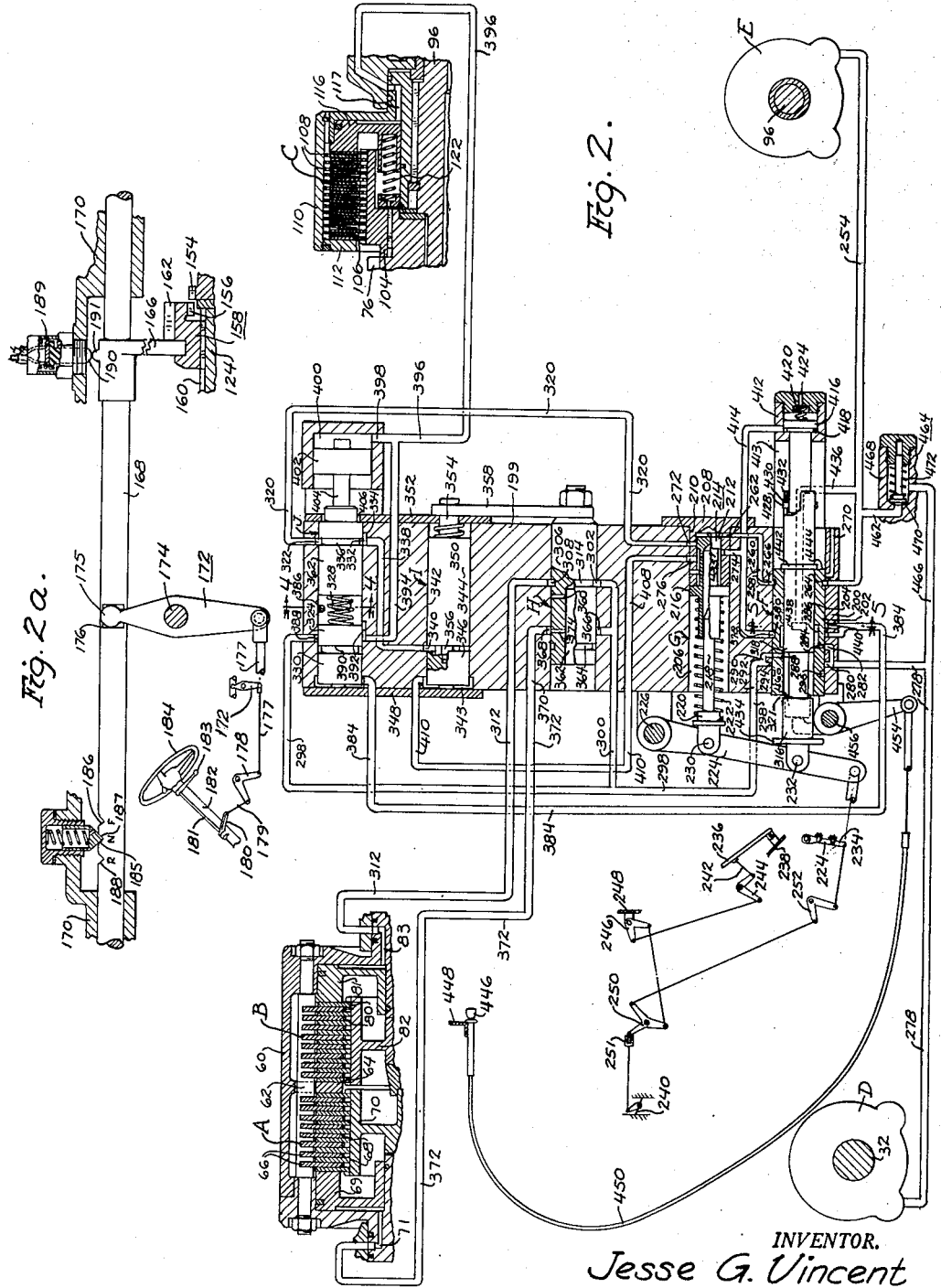
Fig. 2 is a diagrammatic view illustrating my improved transmission control mechanism shown in the neutral position.

The front and rear clutches A and B, and the high range clutch C are controlled by a series interconnected clutch selecting and clutch actuating valves, as illustrated diagrammatically in Fig. 2 to vary the time of engagement of the clutches A, B and C in proportion to variations of vehicle speed and accelerator pedal position.

Figure 12:
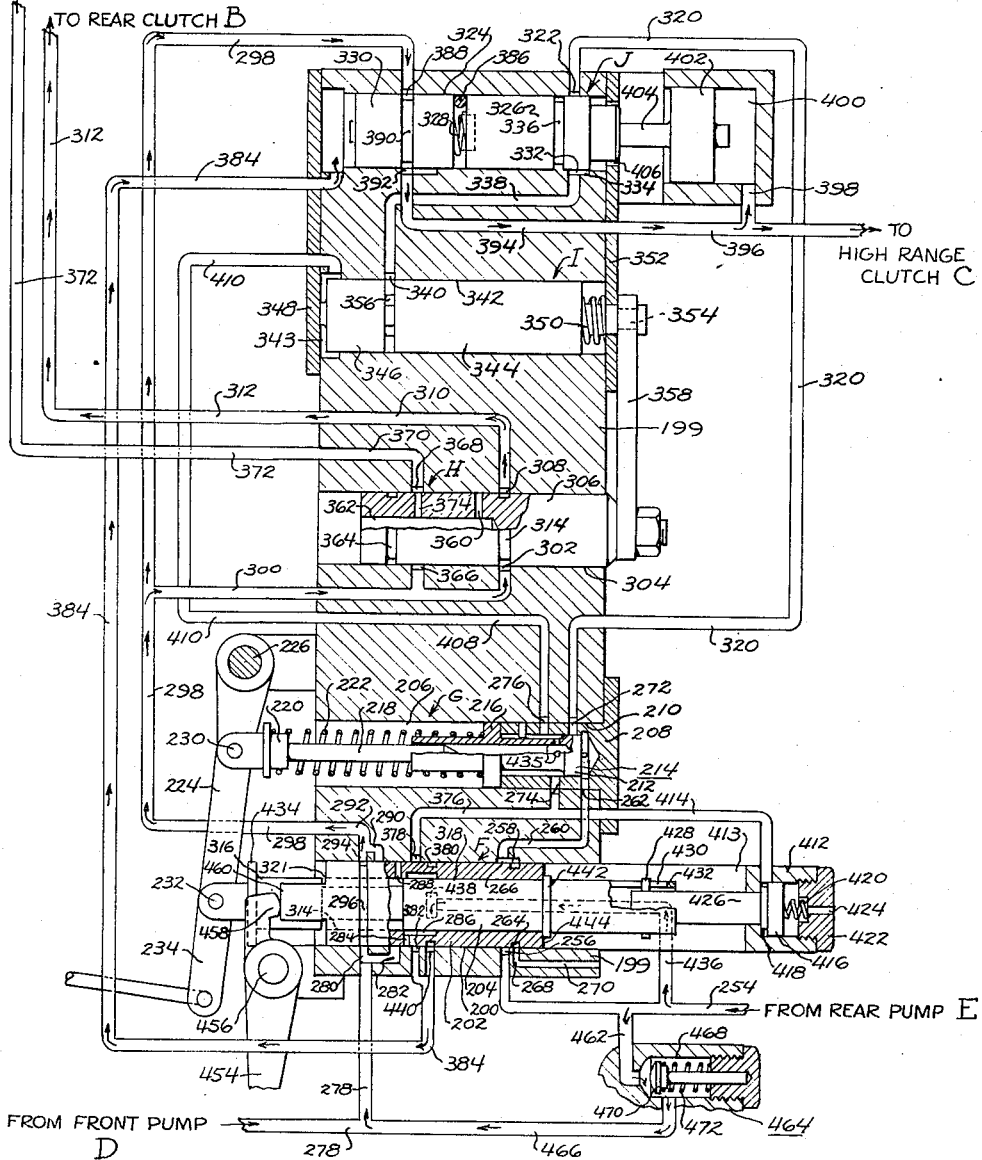

Except in the push start position illustrated in Fig. 12 the front pump D driven by the engine through the clutch driving shaft 32 supplies fluid under pressure to engage the front and rear clutches A and B and the high range clutch C, and the rear pump E driven by the final driven shaft 96 which drives the vehicle supplies fluid under pressure to actuate the clutch selecting and controlling valves, means operably connected to the accelerator pedal being provided to influence the actuation of the clutch selecting and controlling valves.

The clutch selecting and controlling mechanism is housed within a casing 199 adapted to be secured to the transmission casing and includes a kickdown valve F, a master valve G, a clutch selector valve H, a clutch actuating valve I and a high range clutch valve J.

The kickdown valve F includes a cylinder 200 having a sleeve 202 slidably mounted therein, and a plunger 204 slidably mounted in the sleeve 202.

The master valve G includes a cylinder 206 having a fitting 208 including a cylinder 210 of reduced diameter to receive the lower end 212 of a compound piston 214 having a section 216 slidably mounted in the cylinder 210. The forward end of the piston 214 is hollow, and forms a guide for a plunger 218 having a head 220 to engage the forward end of a spring 222 bearing against the section 216 of the piston 214 to resist forward movement of the piston 214.

Figure 3:
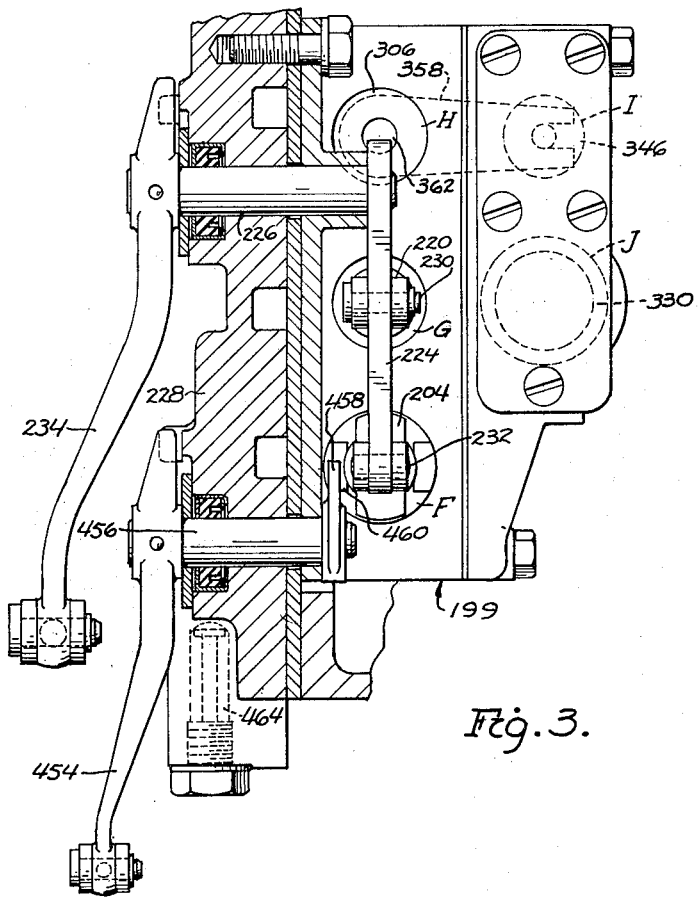
Fig. 3 is an enlarged sectional view through a portion of the control box illustrating the mechanism for actuating certain of the control valves.
Figure 4:
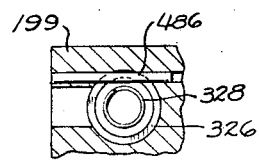
Fig. 4 is a fragmentary sectional view taken substantially on the line 4—4 of Fig. 2 looking in the direction of the arrows.
Figure 5:
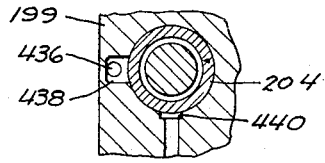
Fig. 5 is a fragmentary view taken substantially on the line 5—5 of Fig. 2 looking in the direction of the arrows.

Means are provided to increase the force exerted on the piston 214 by the spring 222 in proportion to throttle opening movement of the accelerator pedal. One illustrative form of spring load increasing mechanism includes an arm 224 secured to a shaft 226 journalled in the housing 228 as illustrated in Figs. 2 and 3. The arm 224 is connected by pins 230 and 232 with the bifurcated ends of the head 220 of the master valve G, and with the bifurcated ends of the plunger 204 of the kickdown valve F respectively. The shaft 226 which actuates the arm 224 is provided with an actuating arm 234 positioned on the outside of the housing 228.

As illustrated in Fig. 2 an accelerator pedal 236 pivotally mounted on the toeboard 238 of a motor vehicle is connected to actuate a throttle valve 240 in the induction passage of a carburetor by any suitable linkage such for example as a link 242 connected to one arm of a bell crank 224 having its other arm connected to an arm of a bell crank 246 pivotally mounted on a wall 248 in the vehicle. The other arm of the bell crank 246 is connected to one arm of a three armed bell crank 250 having one of its other arms connected through a yielding connection 251 to actuate the throttle valve 240, and having its third arm connected to one arm of a bell crank 252 having its other arm connected to the actuating arm 234 as illustrated diagrammatically in Fig. 2. It will be apparent that as the accelerator pedal 236 is moved in the throttle opening direction, the arm 224 is oscillated in the counter-clockwise direction to increase the load exerted by the spring 222 on the piston 214 of the master valve G, and to project the plunger 204 into the kickdown sleeve 202 of the kickdown valve F.

Means are provided to supply fluid under pressure from the rear pump E to urge the piston 214 of the master valve G forwardly against the resistance of the spring 222 to successively align spaced ports in the master valve G to successively engage progressively higher speed ratio drives through the clutches A, B and C.

Figure 10:
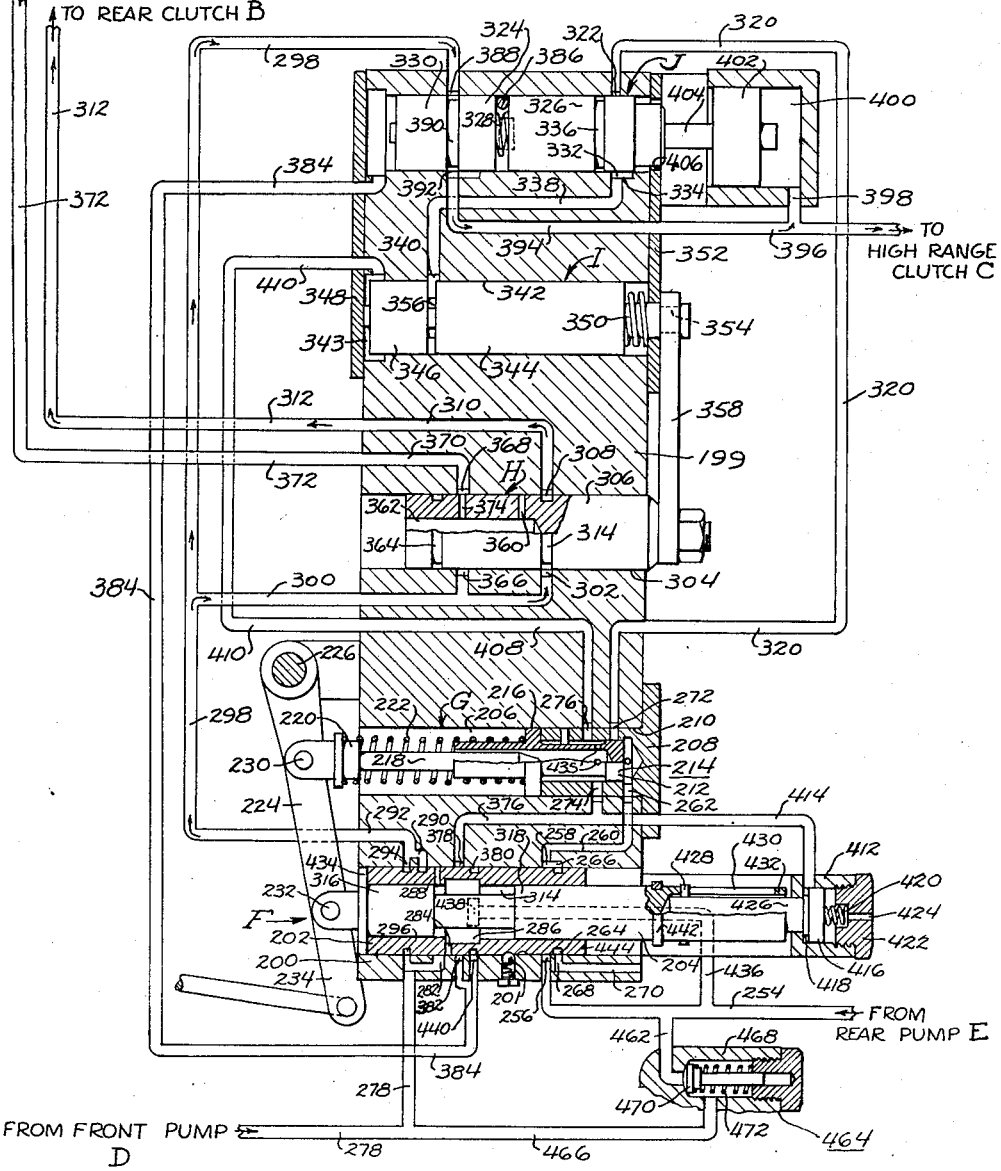
Figs. 10, 11 and 12 are views similar to Fig. 3 illustrating the controls in the kickdown, geared hill braking and push start positions.
Figure 11:
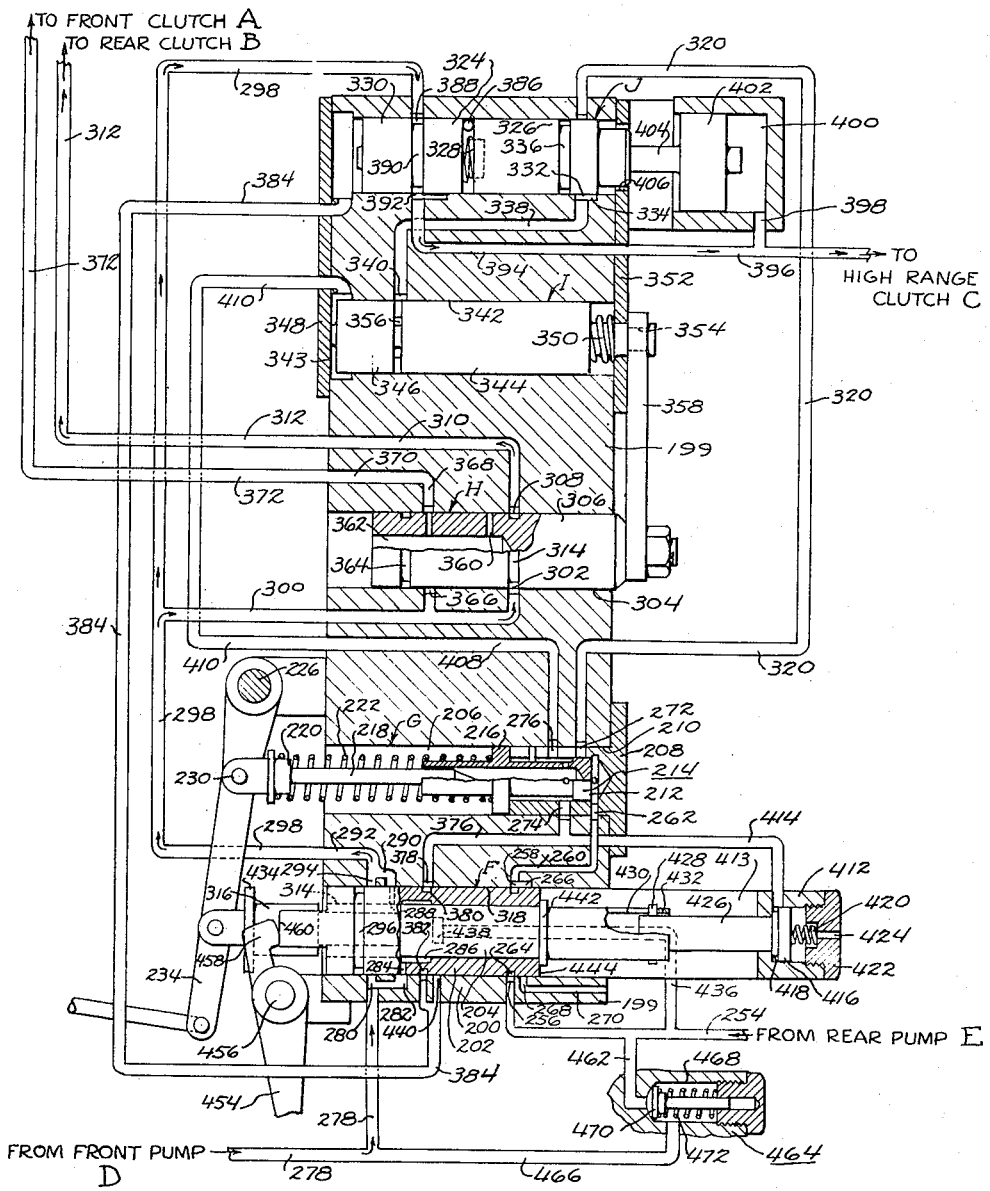

The rear pump E is connected through a conduit 254 with a port 256 in the cylinder 200 of the kickdown valve F. A port 258 aligned with the port 256 communicates through a passage 260 in the valve body with the rear end 262 of the cylinder 210 of the master valve G. The kickdown sleeve 202 is provided with a groove 264 to interconnect the ports 256 and 258 in the kickdown valve cylinder 200 when the sleeve 202 is in the normal position illustrated in Figs. 2 and 6 to 9. The cylinder 200 of the kickdown valve F is formed with an axially extending groove 266 in alignment with a port 268 communicating with a vent passage 270 to vent the bottom 262 of the cylinder 210 of the master valve G when the kickdown sleeve 202 is moved to the kickdown position to interconnect the groove 266 with the port 268 through the groove 264 as illustrated in Figs. 10 to 12.

The fitting 208 housing the cylinder 210 in the master valve G is provided with spaced second, third and fourth speed ports 272, 274 and 276 respectively to supply fluid under pressure from the rear pump E to actuate the valves H, I and J to successively engage the second, third and fourth speed ratio drives.

The front pump D is connected through a conduit 278 with spaced ports 280 and 282 in the cylinder 200 of the kickdown valve F. The kickdown sleeve 202 is provided with a radial bore 284 adapted to align with the port 282 when the kickdown sleeve 202 is in the normal position illustrated in Figs. 2 and 6 to 9. The port 282 communicates with an annular axially extended groove 286 extending around the inner surface of the kickdown sleeve 202. The sleeve 202 is also provided with a radially extended passage 288 spaced axially between the ports 280 and 282 when the sleeve 202 is in the normal position illustrated in Figs. 2 and 6 to 9.

The passage 288 in the kickdown sleeve 202 communicates when in the normal position with a port 290 in the cylinder 200. The port 290 connects with a passage 292 having a port 294 aligned with the port 280 as illustrated. The kickdown sleeve 202 is provided with a groove 296 adapted to interconnect the ports 280 and 294 when the sleeve 202 is in the kickdown position illustrated in Figs. 10 to 12.

The passage 292 communicates through conduits 298 and 300 with a port 302 in the cylinder 304 of the clutch selector valve H having a piston 306 slidable therein. A port 308 in the cylinder 304 is aligned with the port 302 and communicates through a passage 310 and a conduit 312 with the passage 83 for engaging the rear clutch B. The piston 306 has an annular groove 314 adapted in the neutral, first, third, kickdown and geared hill braking positions shown in Figs. 2, 6, 8, 10 and 11 respectively to interconnect the ports 302 and 308.

The plunger 204 of the kickdown valve F is provided with a section of reduced diameter defining an axially extended annular chamber 314 interposed between sections 316 and 318 of larger diameter slidably mounted in the bore of the sleeve 202.

Referring now more particularly to Fig. 2 wherein the control mechanism is shown in the neutral position it will be noted that the forward end of the section 318 of the kickdown plunger 204 is positioned to overlie the port 284 in the sleeve 202 thereby preventing fluid under pressure from the front pump D from flowing through passages 288 and 290 to passage 292 and the clutch selector valve H to engage the rear clutch B to initiate the first speed ratio drive. It will also be noted that the forward end of the section 318 of the plunger 204 is spaced rearwardly from the port 290 to permit clutch engaging fluid to flow through the annular chamber 314 and be vented through the space 320 between the section 316 of the plunger 204 and the forward end of the kickdown sleeve 202. The transmission is thus maintained inoperative in the neutral position because the clutches are vented and clutch engaging fluid pressure from the front pump D is blocked off and cannot reach any of the clutches.

Figure 6:
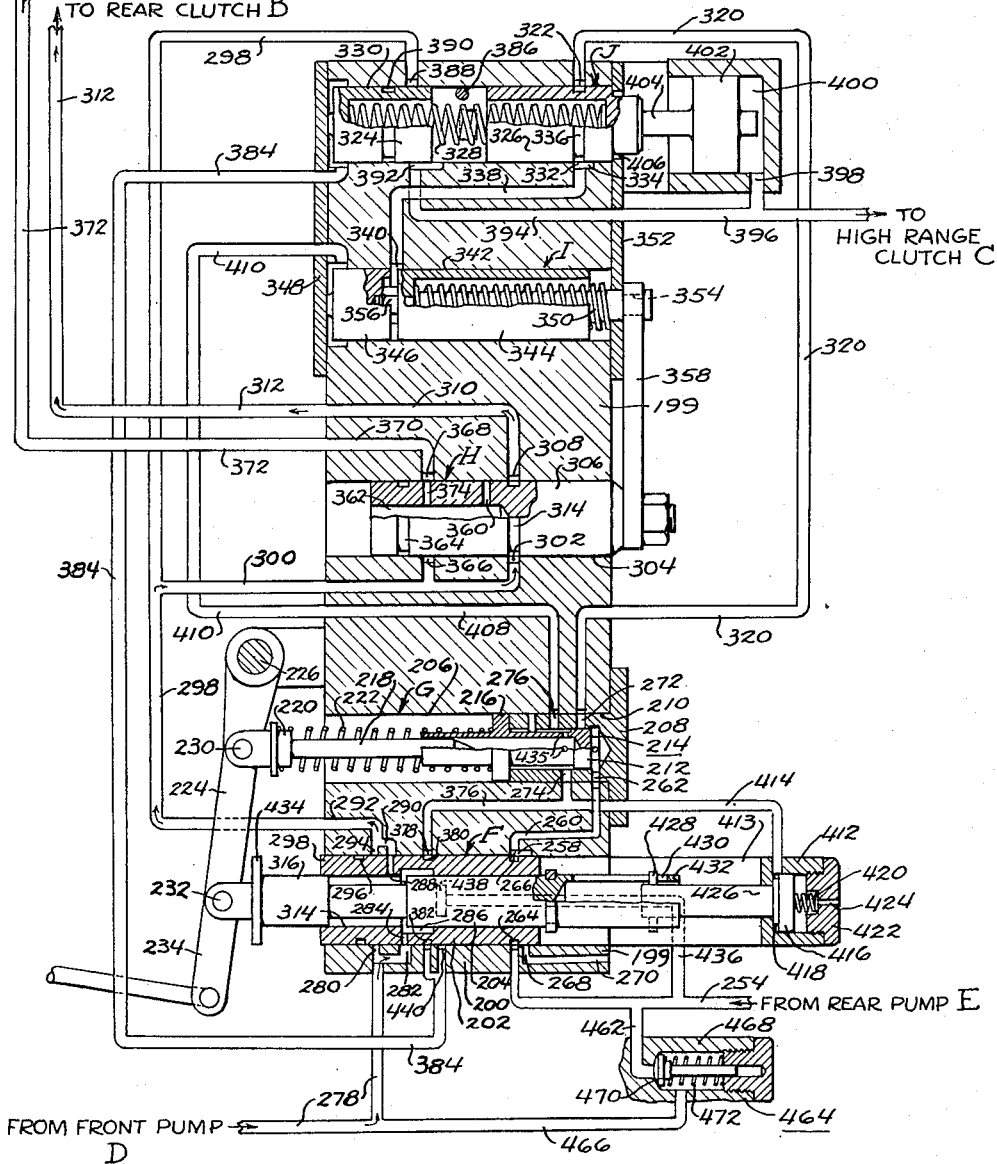
Fig. 6 is a diagrammatic view illustrating the control mechanism in the first speed position.

The first speed drive position is illustrated in Fig. 6. The initial movement of the accelerator pedal 236 is transmitted through the above described linkage to move the kickdown valve plunger 204 to project the forward section 316 into the bore of the sleeve 202 to interrupt the venting of the rear clutch B, and to move the section 318 to uncover the port 284 in the sleeve 202. Fluid under pressure from the front pump D then flows from the conduit 278 and port 284 through the annular chamber 314 through ports 288 and 290, passage 292, conduits 298 and 300, port 302, groove 315 in the piston 306 of the clutch selector valve H, port 308, passage 310, conduit 312 and passage 83, to engage the rear clutch B to initiate the first speed ratio drive.

The rate of engagement of the rear clutch B is proportionate to the rate of acceleration of the engine. For example, if the engine is accelerated relatively slowly, the build up of clutch engaging fluid pressure at the rear clutch B is relatively slow, but if the engine is accelerated rapidly the pressure built up to engage the clutch is rapid. The operator thus controls the rate of engagement of the clutches through operation of the accelerator pedal.

When the vehicle starts to move in the first speed ratio drive, fluid pressure is developed by the rear pump E. This pressure is transmitted through the conduit 254, port 256, groove 264 in kickdown sleeve 202, port 258 and passage 260 to the rear end 262 of the cylinder 210 of the master valve G. The pressure exerted in the cylinder 210 urges the piston 214 forwardly to progressively uncover successively spaced higher speed ratio ports 272, 274 and 276 with a force proportioned to the speed of the vehicle.

The fluid pressure required to shift the piston 214 of the master valve G forwardly to engage successively higher speed ratio drives is influenced by the torque supplied by the engine controlled by the position of the accelerator pedal 236 because with increased throttle opening movement of the accelerator pedal the actuating arm 234 connected to the accelerator pedal projects the plunger 218 of the master valve G further into the forward end of the piston 214, thereby progressively increasing the tension of the spring 222 resisting forward movement of the piston 214. The movement of the piston 214 to engage successively higher speed ratio drives is thus controlled jointly by the speed of the vehicle and the position of the accelerator pedal.

Figure 7:
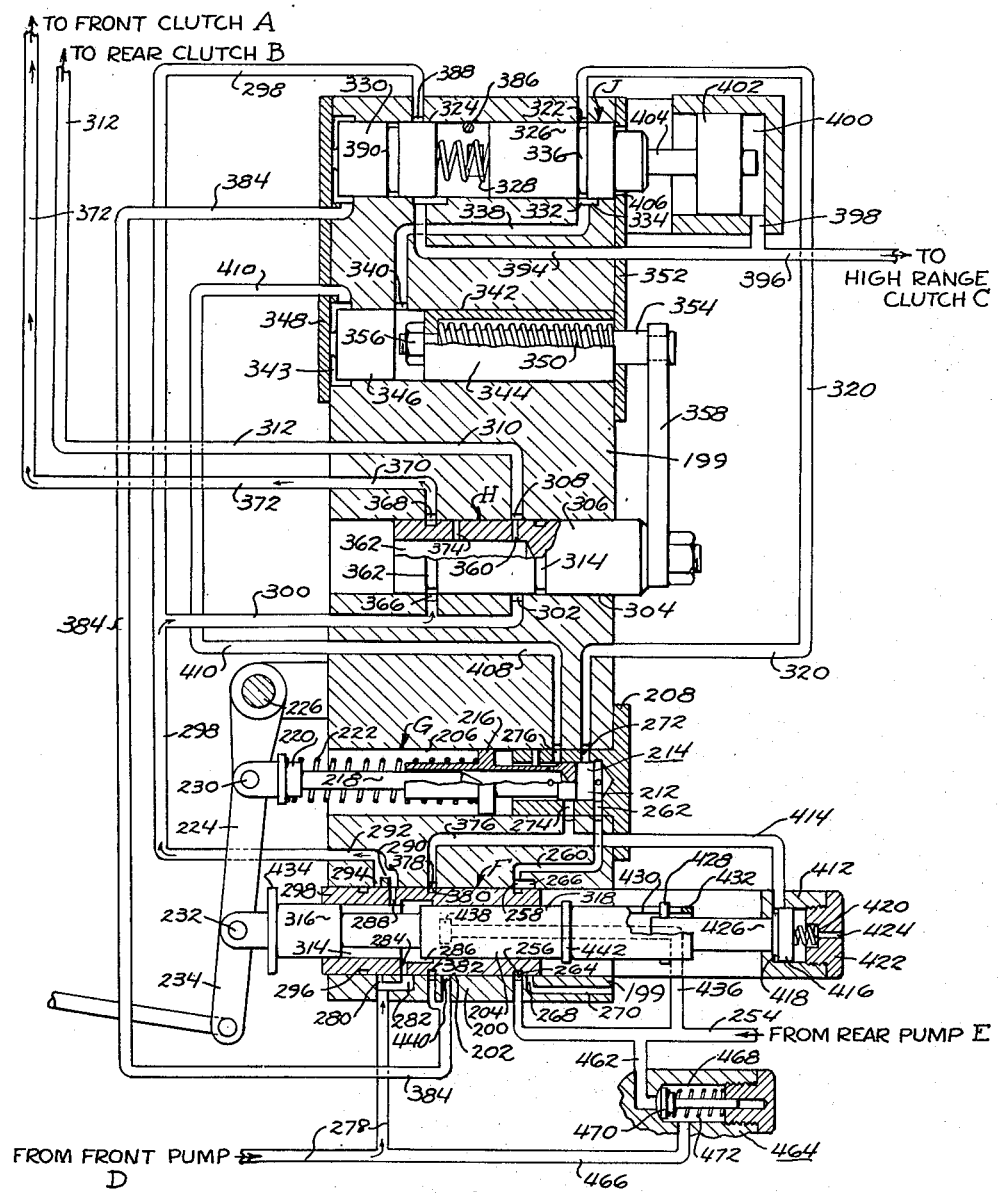
Figs. 7, 8 and 9 are views similar to Fig. 3 illustrating the controls in the second, third and fourth speed positions.

When the piston 214 of the master valve G is moved forwardly to uncover the second speed port 272, fluid under pressure developed by the rear pump E, which actuates the control valve mechanism, flows from the cylinder 210 through a conduit 320 to a port 322 in a cylinder 324 of the high range clutch valve J as illustrated in Fig. 7. A high range valve piston 326 is slidably mounted in the cylinder 324 and is yieldingly urged rearwardly therein by a spring 328 interposed between the high range valve piston 326 and a high range clutch piston 330 slidably mounted in the forward end of the cylinder 324.

The cylinder 324 is provided with a port 332 aligned with the port 322 and having an axially extending groove 334. The ports 322 and 332 are adapted to be interconnected by a groove 336 in the high range valve piston 326 when the piston is in the rearmost position illustrated in Fig. 7. The port 332 communicates through a passage 338 and a port 340 with a cylinder 342 of the clutch actuating valve I between adjacently disposed second and fourth speed actuating pistons 344 and 346 slidably mounted in the cylinder 342. The forward end of the fourth speed piston 346 abuts a cover plate 348 to limit its forward movement, and the piston 344 is yieldingly urged toward engagement with the piston 346 by a spring 350 interposed between the piston 344 and a plate 352. The piston 344 is provided with a stem 354 secured to the piston by a nut 356 and having a link 358 at its opposite end to actuate the piston 306 of the clutch selector valve H.

When fluid under pressure developed by the rear pump E is transmitted through the high range clutch valve J, passage 338 and port 340 to the cylinder 342 between the pistons 344 and 346, the fourth speed piston 346 is restrained from moving forwardly by the plate 348 of the casing 199 whereupon the second speed piston 344 is moved rearwardly against the resistance of spring 350 to move the piston 306 of the clutch selector valve H rearwardly through the link 358 to the second speed position illustrated in Fig. 7. Rearward movement of the piston 306 in its cylinder 304 interrupts communication between the port 302 of the conduit 300 and the port 308 of the passage 310 which supplies fluid under pressure from the front pump D to engage the rear clutch B. It will be noted that a vent passage 360 in the piston 306 is aligned with the port 308 to vent the rear clutch B through the hollow forward end 362 of the piston 306.

The piston 306 has a second groove 364 to interconnect a port 366, connecting the conduit 300, with a port 368 communicating through a passage 370 and a conduit 372 with the passage 71 to engage the front clutch A by fluid pressure supplied by the front pump D.

As illustrated in Fig. 6 the piston 306 has a vent passage 374 to vent the front clutch A through the hollow forward end 362 of the piston 306 when the piston 306 is positioned to engage the rear clutch B.

Figure 8:
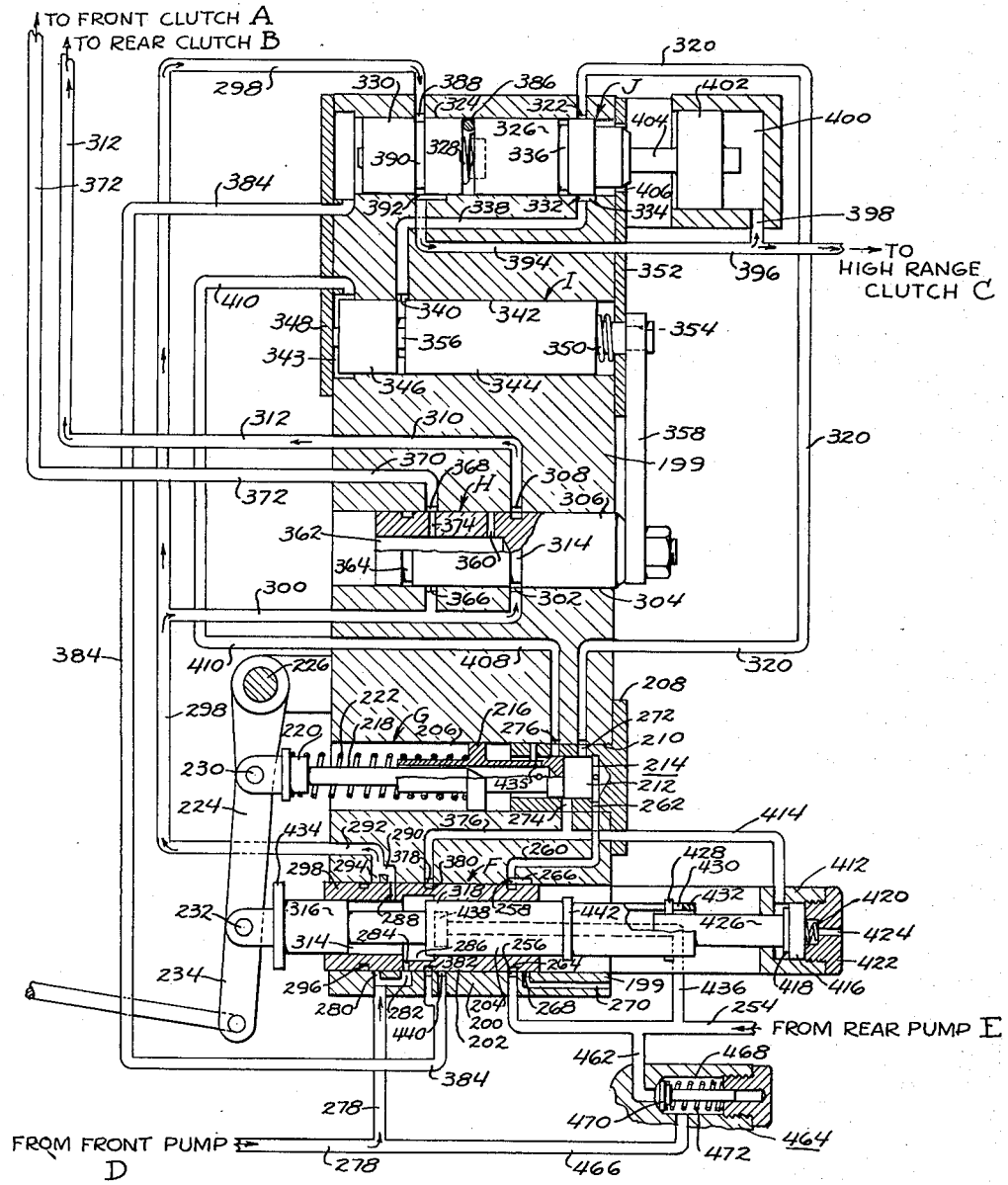

As the vehicle continues to accelerate the fluid pressure developed by the rear pump E, opposed by the spring 222 loaded by throttle opening movement of the accelerator pedal 236, moves the piston 214 of the master valve G to uncover the third speed port 274. When the port 274 is uncovered fluid pressure developed by the rear pump E flows through a passage 376, through a port 378 in the kickdown cylinder 200, groove 380 in the kickdown sleeve 202, port 382 in the cylinder 200 aligned with the port 378 and a conduit 384 to the forward end of the cylinder 324 of the high range clutch valve J to move the piston 330 rearwardly into engagement with a stop 386 as illustrated in Fig. 8.

The conduit 298 supplied with fluid under pressure from the front pump D terminates in a port 388 in the cylinder 324 adapted to be connected through a groove 390 in the valve 330 with a port 392 communicating with a passage 394 connected to a conduit 396 leading to the passage 117 of the high range clutch C as illustrated in Fig. 2.

The conduit 396 has a branch conduit 398 leading to a cylinder 400 having a piston 402 provided with an extension 404 to engage the end of the high range valve 326 and move it forwardly in the cylinder 324 to interrupt communication between the port 322 of the second speed conduit 320, supplied by fluid under pressure from the rear pump E, and the groove 336 in the valve 326. It will be noted that the axially extending groove 334 associated with the port 332 communicates with a vent passage 406 in the rear end of the high range clutch valve J to vent the conduit 338 and cylinder 342 between the second and fourth speed actuating pistons 344 and 346 to permit the spring 350 to urge the second speed piston 344 forwardly to move the piston 306 of the clutch selector valve H forwardly through the link 358.

Forward movement of the piston 306 of the clutch selector valve H connects the conduit 372 and passage 370 with the vent 374 to disengage the front clutch A, and connects the conduit 312 and passageway 310 with the groove 315 in the piston 306 to direct fluid under pressure, supplied through the conduit 300 from the front pump D, to engage the rear clutch B, the high range clutch C also being engaged to transmit the drive in the third speed ratio.

Figure 9:
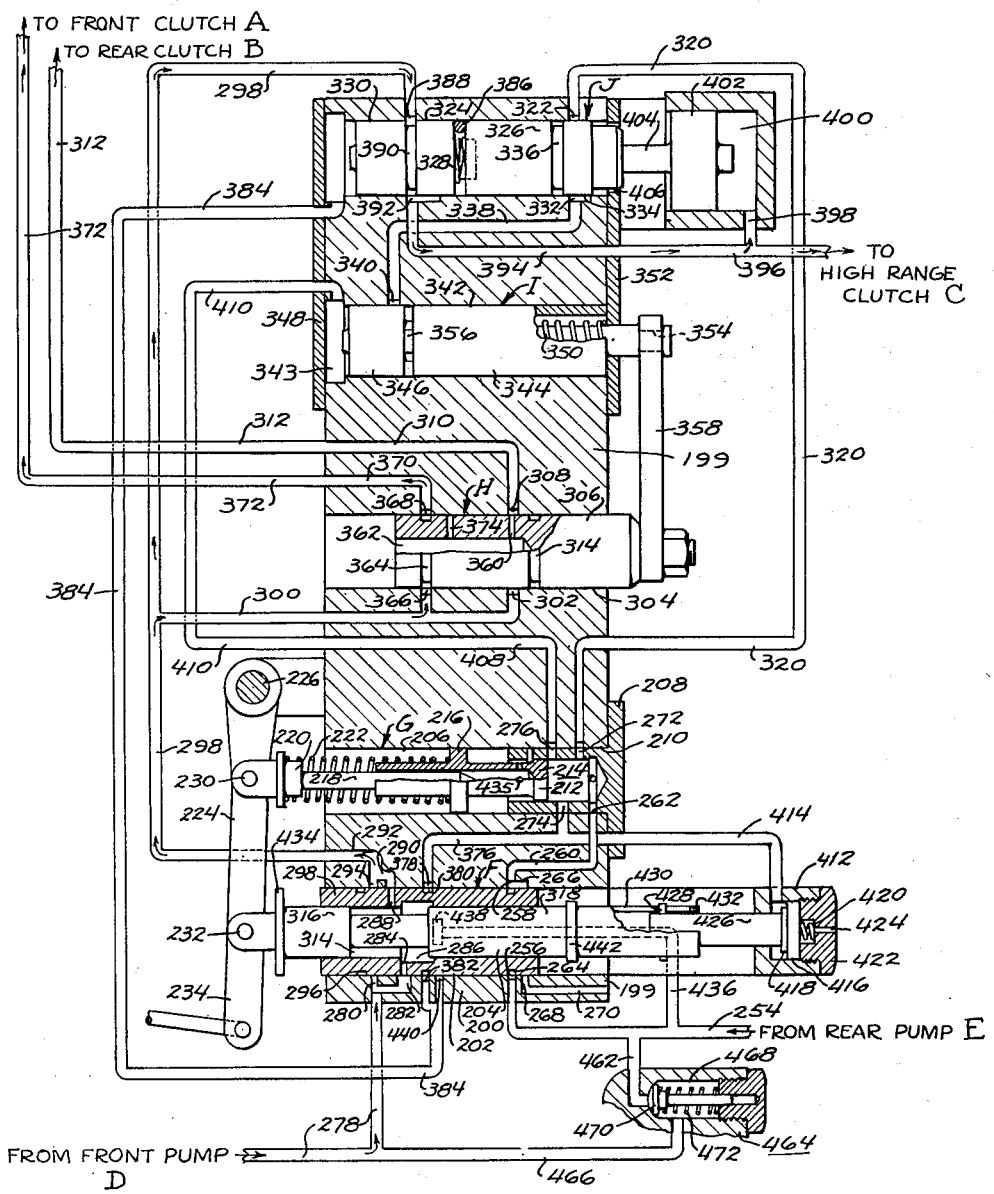

As illustrated in Fig. 9 when the vehicle accelerates in the third speed ratio drive to such a point that the pressure developed by the rear pump E and exerted on the piston 214 of the master valve G is sufficient to overcome the force exerted by the spring 222, the piston 214 moves forwardly to uncover the port 276 to establish the fourth speed ratio or direct drive.

As the port 276 is uncovered, fluid under pressure from the rear pump E flows from the cylinder 210 through a passage 408 and a conduit 410 to the forward end of the cylinder 342 of the clutch actuating valve I to move the fourth speed piston 346 and the second speed piston 344 rearwardly against the resistance of spring 350 thereby shifting the piston 306 of the clutch selector valve H rearwardly through the link 358. Rearward movement of the piston 306 of the clutch selector valve H aligns the vent 360 with the port 308 communicating with the rear clutch B through the passage 310 and conduit 312 to render the rear clutch B inoperative. The groove 364 in the piston 306 interconnects the port 366 communicating with the conduit 300 with the port 368 to direct fluid under pressure from the front pump D through the passage 370 and conduit 372 to engage the front clutch A, the high range clutch C remaining engaged to provide a direct drive from the engine to the final driven shaft 96.

Means operative when the high range clutch C is engaged are provided to prevent the clutch engaging fluid pressure supplied by the front pump D from being vented through the space 321 between the forward section 318 of the plunger 204 and the forward end of the kickdown sleeve 202 when the accelerator pedal 236 is released as illustrated in the neutral position shown in Fig. 2. One illustrative form of such means comprises a cylinder 412 supported on bracket members 413 on the casing 109 and having its forward end connected to the third speed port 274 by a conduit 414 to supply fluid under pressure to the cylinder 412 from the rear pump E when the piston 214 of the master valve G is displaced forwardly to engage the third speed ratio drive as illustrated in Fig. 8. A piston 416 is slidably mounted in the cylinder 412, and has its forward end grooved as illustrated at 418 to permit fluid pressure to urge it rearwardly in the cylinder 412 against the resistance of a spring 420 interposed between the rear face of the piston 416 and a retaining plug 422 having a vent passage 424 to vent the cylinder 412. The piston 416 is provided with a forwardly extending stem 426 having a cross pin 428 slidably mounted in a slot 430 formed in the rearward end of the plunger 204 to engage the unslotted end 432 of the plunger and prevent it from moving forwardly to such a point as to open the vent space 321 illustrated in Fig. 2 between the forward ends of the plunger 204 and the kickdown sleeve 202. It will thus be apparent that if the accelerator pedal 236 is released, while the transmission is operating in the high range to transmit power through the third or fourth speed ratio drives, the plunger 204 cannot move forwardly with reference to the sleeve 202 to vent the clutch engaging fluid pressure supplied by the front pump D.

Under certain conditions of operation when the transmission is operating in the fourth speed ratio or direct drive it is desirable, as when passing another vehicle or ascending a hill, to accelerate the vehicle more rapidly than is possible in the highest speed ratio drive. Means operated by movement of the accelerator pedal 236, beyond the full throttle position, to a kickdown position have therefore been provided as illustrated in Fig. 10 to disengage the direct drive and engage the third speed ratio drive to provide the desired acceleration.

The forward end of the plunger 204 of the kickdown valve F is provided with a shoulder 434 to engage the forward end of the kickdown sleeve 202 and move it rearwardly in the cylinder 200 when the accelerator pedal 236 is fully depressed. A spring pressed ball 201 adapted to selectively engage either of two spaced grooves is provided to releasably hold the sleeve 202 in either the normal or the kickdown position.

When the sleeve 202 is displaced rearwardly the circumferential groove 264 in the sleeve interconnects the rear end of the axially extending groove 266 in the cylinder 200 with the port 268 connected with the vent 270 to vent the cylinder 210 behind the piston 214 of the master valve G, through the passage 260 and port 258. The master valve G is thus rendered inoperative, and the spring 222 urges the piston 214 rearwardly in its cylinder. The master valve remains inoperative as long as the sleeve 202 remains in the kickdown position because no fluid can be supplied thereto so long as the circumferential groove 264 of the sleeve 202 is out of alignment with the port 256 of the conduit 254 from the rear pump E.

As the master valve G is vented fluid flows out of the forward end 343 of the cylinder 342 of the clutch actuating valve I through the conduit 410, fourth speed port 276 of the master valve, through radial orifices 435 in the piston 214 whereupon the spring 350 urges the second and fourth speed pistons 344 and 346 forwardly to shift the piston 306 of the clutch selector valve H forwardly through the link 358 to vent the front clutch A, and engage the rear clutch B to transfer the drive to the third speed ratio gearing.

It will be noted that a passage 436 communicating with the conduit 254 from the rear pump E extends through the casing 109 and terminates in a port 438 adapted to supply fluid under pressure from the rear pump E to the circumferential groove 380 of the sleeve 202 aligned with a port 440 in the cylinder 200 to direct fluid to the conduit 384 when the sleeve 202 is in the kickdown position to hold the high range clutch piston 330 of the valve J in the high range position in engagement with the stop 386 to insure continued engagement of the high range clutch C. The branch conduit 398 connected with the conduit 396, communicating with the high range clutch C, continues to supply fluid under pressure from the front pump D to the cylinder 400 to maintain the piston 402 in the forward position. The high range valve piston 326 is thus held forwardly in the cylinder 324 against the resistance of spring 328 to maintain the groove 336 out of alignment with the ports 322 and 332 to prevent fluid from the rear pump E from being transmitted through the second speed port 272 of the master valve G and conduit 320 to the clutch actuating valve I, between the second and fourth speed pistons 344 and 346, to engage the front clutch A.

When the sleeve 202 of the kickdown valve F is in the kickdown position as illustrated in Figs. 10 to 12, fluid under pressure to engage the rear clutch B and the high range clutch C is transmitted from the front pump D through the conduit 278 and port 280, circumferential groove 296 in the sleeve 202, port 294 and passage 292 to the conduit 293 communicating with the high range clutch C as previously described to maintain engagement of the high range clutch C. With the sleeve 202 in the kickdown position fluid under pressure from the front pump D flows through the conduit 396 and clutch selector valve H as previously described to engage the rear clutch B.

The sleeve 202 of the kickdown valve F will remain in kickdown position to transmit the drive through the rear clutch B in the third speed ratio with the high range clutch C engaged until the accelerator pedal 236 is completely released. The plunger 204 of the kickdown valve F actuated by movement of the accelerator pedal through the arm 234 is provided with a radially extended projection or snap ring 442 to engage the rear end 444 of the sleeve 202 and move it forwardly out of the kickdown position when the accelerator pedal 236 is fully released. Thereafter the controls function in the normal manner as previously described.

Under certain conditions of operation it is desirable to employ the braking effort of the engine in an underdriven gear ratio to prevent the vehicle from travelling too fast when going down a hill. Means operable by the driver of the vehicle have therefore been provided as illustrated in Fig. 11 to shift the sleeve 202 of the kickdown valve F rearwardly to the kickdown position to engage the rear clutch B and transmit the drive through the third speed ratio gearing with the high range clutch C engaged.

The sleeve 202 of the kickdown valve F could of course be moved rearwardly to the kickdown position by movement of the accelerator pedal 236 beyond the full throttle position, but such movement of the accelerator pedal to engage a lower speed ratio drive would still further accelerate the vehicle and such movement is contrary to one's normal reaction when it is desired to engage a lower speed ratio to decelerate the vehicle. Manually operable means have therefore been provided to shift the sleeve 202 of the kickdown valve F rearwardly to the kickdown position. One illustrative example of such geared hill braking mechanism is disclosed in Figs. 2 and 11, and includes a manually operable push-pull knob 446 positioned on the instrument panel 448 of the vehicle. The knob 446 is connected through any suitable motion transmitting mechanism, such as a Bowden cable 450, with one end 452 of a lever 454 pivoted at 456 and having an actuating arm 458 adapted to engage a forwardly extending projection 460 of the kickdown sleeve 202.

When the knob 446 is pulled out the sleeve 202 of the kickdown valve F is shifted rearwardly to the kickdown position, whereupon the front clutch A is released and the rear clutch B is engaged to transmit the drive in the third speed ratio as more fully described in connection with Fig. 10. The transmission will continue to operate in the third speed ratio drive as long as the knob 446 is in the pulled out position. The sleeve 202 will be carried forwardly out of the geared hill braking or kickdown position upon complete release of the accelerator pedal after the knob 446 has been returned to its normal position.

It is desirable that means be provided to permit starting the engine by pushing the vehicle. One illustrative example of push starting means is illustrated in Fig. 12 wherein the sleeve 202 is moved to the kickdown position, and the conduit 254 from the rear pump E is connected through a branch conduit 462, a check valve 464 and a branch conduit 466 with the conduit 278 from the front pump D to permit fluid pressure from the rear pump E to enter the circuit of the front pump D to engage the rear clutch B and the high range clutch C to drive the engine in the third speed ratio when the vehicle is pushed or pulled.

The check valve 464 consists of a cylinder 468 having one of its ends communicating with the branch conduit 462, and communicating through its side with the branch conduit 466. A plunger 470 is slidably mounted in the cylinder 468 and is yieldingly urged by a spring 472 to close the branch conduit 462 communicating with the rear pump E.

To start the engine by pushing the vehicle, the sleeve 202 is moved to the kickdown position either by pulling out knob 446 on the instrumental panel or by movement of the accelerator pedal beyond the full throttle position. The vehicle is then pushed whereupon the rear pump E driven by the final driven shaft 96 delivers fluid under pressure through the conduit 254 to the branch conduits 436 and 462, the master valve G being rendered inoperative. Fluid delivered through the branch conduit 436 is transmitted through the ports 438 and 440 in the cylinder 200 and sleeve 202 of the kickdown valve F to the conduit 384 communicating with the forward end of the cylinder 324 of the high range clutch valve J to move the piston 330 rearwardly to the position illustrated in Fig. 12 thereby aligning the groove 390 with the ports 388 and 392 to transmit fluid under pressure through the passage 394 and conduit 396 to engage the high range clutch C.

Fluid flowing through the branch conduit 462 subjects the forward end of the plunger 470 of the check valve 464 to pressure to move it axially in the cylinder 468, compressing the spring 472, and admitting fluid under pressure from the rear pump E to the conduit 278 communicating with the front pump D through the conduit 466. Fluid from the conduit 278 flows through the port 280, groove 296, port 294, passage 292 and conduit 298 to the high range clutch valve J, through the port 388, groove 390 in the high range clutch piston 330, port 392, passage 394 and conduit 396 to engage the high range clutch C. Fluid also flows from the conduit 298 through the conduit 300, port 302, groove 314 in the piston 306, port 308, passage 310 and conduit 312 to engage the rear clutch B to establish the third speed ratio drive to crank the engine.

When the engine has started, pressure developed by the front pump D flows through the conduit 278 opposing the flow of fluid through the branch conduit 466 and check valve 464 allowing spring 472 to close the plunger 470 against its seat, whereupon the front pump D supplies fluid pressure through the conduit 278 to maintain engagement of the high range clutch C and the rear clutch B. The sleeve 202 of the kickdown valve F is then returned to its normal position by returning the knob 446 to the inoperative position if it has been pulled out to engage the kickdown position, and by releasing the accelerator pedal 236 to permit the snap ring 442 on the plunger 204 to carry the sleeve 202 forwardly out of the kickdown position. The movement of the kickdown sleeve 202 to the normal position restores the operation of the master valve G whereupon the piston 214 is then subjected to fluid pressure from the rear pump E to engage the appropriate clutches depending on the speed of the vehicle and the position of the accelerator pedal 236.

The operation may be briefly summarized as follows: To start the engine the lever 183 on the steering column 182 is placed in the neutral position to disengage the coupler 158 from the forward and reverse gear train, and to move the cam 191 on the rod 168 to actuate the switch 189 thereby reestablishing the circuit through the starting motor to permit cranking the engine by actuating the starter. Since the starting motor will only function when the shift lever 183 is in the neutral position there is no danger of the car lurching forward as soon as the engine starts.

As soon as the engine starts the front pump D driven by the clutch driving shaft 32 develops fluid pressure, but the kickdown valve plunger 204 prevents fluid from reaching the clutches while the accelerator pedal 236 is released, and any leakage escapes forwardly through the vent space 320 between the kickdown sleeve 202 and plunger 204 as illustrated in Fig. 2.

To drive the vehicle in the forward direction the operator shifts the lever 183 rearwardly to the forward drive position to engage the coupler 158 with the dental teeth 154 of the gear 148.

To engage the first speed ratio drive as illustrated in Fig. 6, the accelerator pedal 236 is depressed to open the carburetor throttle 240. The first increment of this movement of the accelerator pedal closes the space 320 between the kickdown valve plunger 204 and kickdown valve sleeve 202 to allow oil pressure from the front pump D to be directed through the kickdown valve F and clutch selector valve H to engage the rear clutch B. The rear clutch, driving through low range with the high range clutch C disengaged produces first speed. With the car now in motion, the rear pump E begins to operate in direct proportion to the speed of the vehicle.

The shift from first speed into second speed as illustrated in Fig. 7 is automatic, and is produced in the following manner: As the vehicle accelerates in first speed, the fluid pressure developed by the rear pump E increases sufficiently to move the piston 214 of the master valve G until the second speed port 272 is uncovered. Opening of the second speed port allows passage of fluid pressure from the rear pump E to the second speed clutch actuating valve I. This actuating valve moves the clutch selector valve H through link 358. Movement of clutch selector valve H produces two results: (1) The groove 315 of the piston 306 registers with the exhaust port 360 in the piston 306 allowing fluid under pressure to escape from the rear clutch B thereby releasing the rear clutch. (2) Simultaneously with the above action, the movement of the clutch selector valve H registers the groove 364 on the piston 306 with the port 368 to engage the front clutch A. Front clutch A driving through low range produces second speed.

The third speed position is illustrated in Fig. 8 and is attained by continued acceleration of the vehicle to such a point that pressure from the rear pump E will move the piston 214 of the master valve G forwardly to uncover the third speed port 274. With the third speed port uncovered fluid pressure is routed to the high range clutch valve J and moves it to permit fluid pressure from front pump D to engage the high range clutch C. At the same time the piston 402 moves the high range valve piston 326 to cut off fluid pressure from the rear pump E to the second speed clutch actuating valve I and the spring 350 moves it to the venting position. Fluid pressure from the rear pump E is also routed to high range clutch retaining cylinder 612 to prevent releasing of the clutches when the accelerator pedal 236 is released during high range operation. The spring 350 moves piston 344 forwardly to move the piston 306 of clutch valve I through link 358 to vent the front clutch A, and at the same time admitting fluid under pressure from the front pump D to engage the rear clutch B. Rear clutch B driving through high range produces third speed.

Fig. 9 illustrates the fourth speed ratio or direct drive. This shift is automatic and is produced in the following manner: With the vehicle accelerating in third speed, the rear pump pressure increases to move piston 214 of master valve G to uncover the fourth speed port 276. From this port fluid from the rear pump E is exerted against the piston 346 of the clutch actuating valve I to move it and with it the piston 306 of the clutch selector valve H. The movement of clutch selector valve H: (1) Cuts off fluid pressure from the front pump D to the rear clutch B, and at the same time vents it. (2) Allows fluid pressure from the front pump D to the front clutch A to engage it. Front clutch A operating through high range produces fourth speed.

The kickdown position is illustrated in Fig. 10. When the transmission is operating in the high range and the accelerator pedal is depressed to a point beyond full throttle opening i. e. into overtravel, the shoulder 434 on the kickdown valve plunger 204 moves the kickdown sleeve 202 rearwardly as illustrated. With the kickdown sleeve 202 thus repositioned: (1) All fluid pressure to master valve G is cut off, and cylinder 219 is vented, thus the master valve G is completely inoperative, and will remain inoperative until kickdown sleeve 202 is repositioned to its normal (out of kickdown) position. (2) The chambers of the clutch actuating valve I are exhausted because all fluid pressure admitted to them must be relayed through the master valve G which is now exhausted. The spring 350 will then move the pistons 344 and 346 forwardly, and with them the piston 306 of the clutch selector valve H so that it is only possible in the kickdown position to direct fluid pressure to the rear clutch B. (3) Movement of kickdown sleeve 202 allows fluid pressure from the rear pump E to the high range clutch valve J directly, by-passing the route through the master valve. Thus, the transmission remains in the high range when in the kickdown position. With the control in the kickdown position i. e. rear clutch operating through high range, the transmission will be in third speed. The transmission will remain in third speed ratio regardless of throttle opening until the operator momentarily totally releases the accelerator pedal 236. With the accelerator pedal thus completely retracted, the washer 442 on the bottom of the kickdown plunger 204 strikes the bottom of the sleeve 202, and carries it forwardly out of the kickdown position into the normal position. Vehicle operation may then be resumed in the speed selected by the control at the time, depending on the prevailing car speed and accelerator pedal position.

As an added safety feature to permit the operator to use the braking effect of the engine in an underdriven speed ratio for use primarily when driving in hilly country, the push-pull knob 446 on the instrument panel 448 may be pulled out to select the kickdown or third speed ratio drive. The connection from the knob 446 pushes the sleeve 202 of the kickdown valve F into the kickdown position. Thereafter, the control selects the kickdown or third speed ratio as described above in connection with the kickdown position, giving the operator a safe, usable gear ratio for downhill driving.

To start the engine by pushing or pulling the vehicle the operator pulls out the geared hill braking knob 446 on the instrument panel 448 thus engaging the kickdown or third speed ratio. When the car is accelerated by pushing or pulling, the rear pump E driven by the final driven shaft 96 develops fluid pressure. The front pump D is inoperative because the engine is not running, and the check valve 464 allows pressure from the rear pump E into the circuit of the front pump D. This fluid pressure engages the rear clutch B and the high range clutch C to crank the engine in the third speed ratio drive.

After the engine is running, the geared hill braking knob 446 is returned to the inoperative position. The front pump D then supplies fluid pressure to engage the clutches, and the check valve 464 is closed. The rear pump E then supplies fluid pressure to actuate the controls as previously described, and the transmission will operate in whatever range and speed the control selects at the time depending on the prevailing car speed and the position of the accelerator pedal 236.

When rapid acceleration is required, the shift into each successively higher speed ratio is delayed. The need for a higher shift point corresponds closely with the need for increased engine power output, and since engine power output is controlled by the accelerator pedal, it follows that timing in shift must be modified with the position of the accelerator pedal. The pressure developed by the rear pump E tending to shift the piston 214 of the master valve G forwardly is resisted by calibrated spring 222, to increase the resistance to forward movement of the piston 214 in proportion to throttle opening movement of the accelerator pedal 236. The pressure necessary from the rear pump E to move the piston 214 of the master valve G is thus proportionate to accelerator pedal position. Thus, if the operator of the vehicle steps lightly on the accelerator pedal 236, he will not load spring 222 excessively, and its resistance to movement of the piston 214 of the master valve G will be relatively small. Successive opening of the higher speed ratio ports 272, 274 and 276 will therefore occur at relatively slow vehicle speeds because the pressure developed by the rear pump E is directly proportional to car speed.

On the other hand, if the operator of the vehicle depresses the accelerator pedal heavily, he will compress spring 222 thereby increasing its load and resistance to movement of the piston 214 of the master valve G. Vehicle speed and torque will then have to be greater in the speed range before the pressure from the rear pump builds up sufficiently to move the piston 214 of the master valve G against the increased spring load. It follows then that the successive opening of the ports 272, 274 and 276 will be delayed, and will open at higher speeds and engine power outputs to engage successively higher speed ratios.

The vehicle operator may skip a shift—say go from first to third, thus skipping second. When in the first speed drive, the operator may depress the accelerator pedal heavily, thus loading the spring 222 of the master valve G, and demanding relatively high rear pump pressure to move the piston 214 of the master valve G. Before the pressure developed by the rear pump E has had time to build up sufficiently to move the piston 214 of the master valve G to open the second speed port 272, the operator momentarily releases the pressure on the accelerator pedal 236. This will abruptly reduce the load of the spring 222 on the piston 214 of the master valve G, and the high rear pump pressure build-up by the rapid acceleration of the engine will be sufficient to move the piston 214 to open as far as the third speed port 274. Thus, second speed is completely by-passed, and the vehicle is operating in third speed.

If, in the second speed drive, the operator depresses the accelerator pedal heavily, and when the engine has accelerated considerably, momentarily releases pressure on the accelerator pedal, the piston 214 of the master valve G will travel from the second speed port 272 all the way to the fourth speed port 276. The transition from low to high range in the transmission will occur just as described in the first to third skip shift. Since in the second speed ratio the front clutch A is engaged and the fourth speed port 276 also selects the front clutch A, no change in location of piston 306 of the clutch selector valve H will occur. Front clutch A driving through the high range produces fourth speed.

Downshifts are the reverse of upshifts either in regular order if the slowdown is gradual, or in skip downshifts if the slowdown is relatively abrupt as when the car brakes are applied heavily.

Upon releasing the accelerator pedal pressure, while the vehicle is operating in low range, the one-way clutch 140 between the driven gear 134 and the layshaft 124 releases, and the car "free wheels" until the vehicle is either brought to a stop, or until the operator speeds up the engine.

Figure 13:
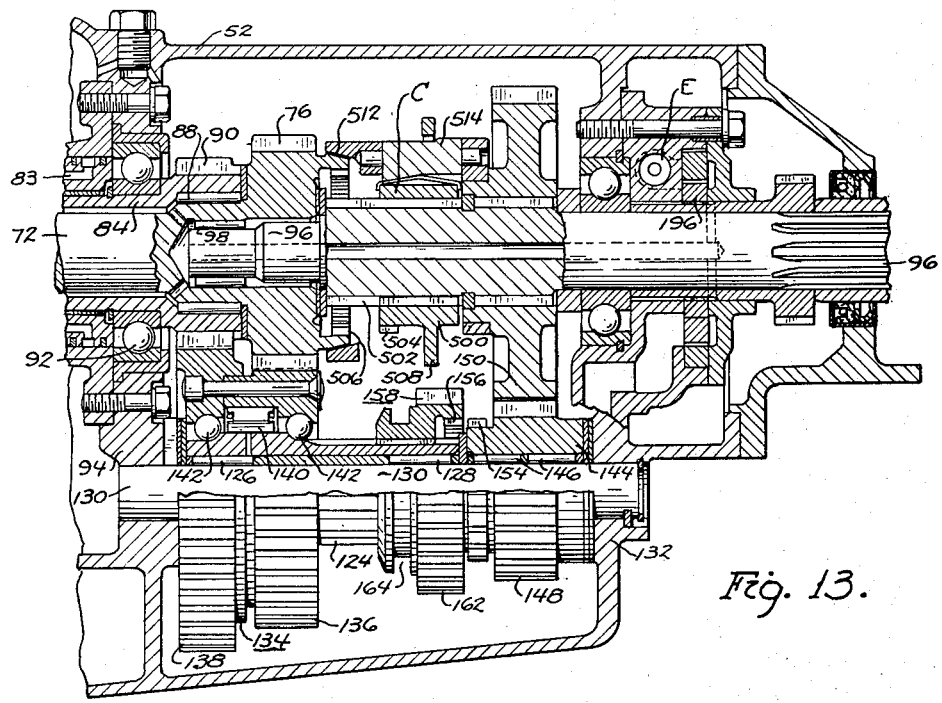
Fig. 13 is a fragmentary sectional view illustrating a modified form of transmission mechanism wherein the high range clutch is in the form of an axially shiftable coupler.
Figure 14:
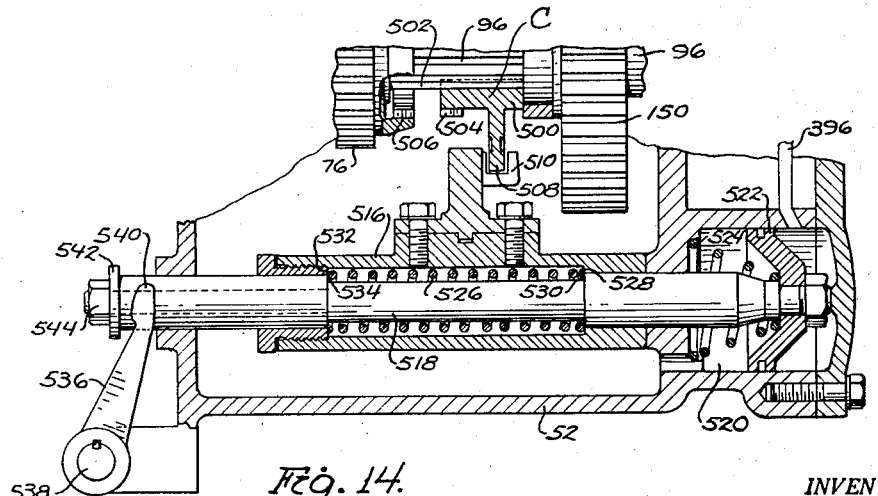
Fig. 14 is a longitudinal sectional view of a mechanism actuated by the fluid pressure operated control mechanism illustrated in Figs. 2 to 12 for shifting the coupler of the high range clutch illustrated in Fig. 13.

The embodiment of the invention illustrated in Figs. 13 and 14 is similar in many respects to that illustrated in Fig. 1. Corresponding reference numerals have therefore been used to designate corresponding parts.

It will be noted that in this embodiment of the invention the high range clutch C is in the form of an axially shiftable coupler 500 mounted on splines 502 carried by the final driven shaft 96. The forward end of the coupler 500 is provided with external dental teeth 504 to engage internal dental teeth 506 carried by the gear 76 secured to the centrally disposed shaft 72 driven by the front clutch A to provide the high ranged drive. The coupler 500 is provided with a radially extended projection 508 adapted to be engaged by a shifter fork 510 illustrated in Fig. 14 to move the coupler 500 forwardly to engage the high range gearing as illustrated in Fig. 13. A synchronizer 512 of known construction is provided to synchronize the speeds of the shafts 72 and 96, and a blocker mechanism 514 of any convenient form is employed to prevent the dental teeth 504 from engaging the dental teeth 506 until the shafts 72 and 96 are rotating at substantially the same speed.

The mechanism for actuating the shifter fork 510 is illustrated in Fig. 14, and includes a shifter sleeve 516 slidably mounted on a rod 518. The rear end of the rod 518 projects into a cylinder 520 and is provided with a piston 522 yieldingly urged rearwardly in the cylinder by a spring 524 to shift the coupler 500 of the high range clutch C rearwardly to disengage the high range gearing.

The conduit 396 from the high range clutch valve J illustrated in Figs. 2 and 6 to 12, supplies fluid under pressure to the rear end of the cylinder 520 from the front pump D to shift the coupler 500 forwardly to engage the high range gearing when the high range clutch piston 330 is shifted rearwardly by fluid pressure from the rear pump E modified by the position of the accelerator pedal 236.

As illustrated in Fig. 14 a coupler actuating spring 526 is interposed between the shifter sleeve 516 and the shifter rod 518. The rear end of the spring 526 engages internal and external shoulders 528 and 530 formed in the sleeve 516 and rod 518, and the forward end of the spring 526 engages the rear end of sleeves 532 and 534 secured to the sleeve 516 and rod 518 respectively to shift the coupler 500 in a known manner.

The operation of this embodiment of the invention is substantially the same as that of the embodiment illustrated in Fig. 1. In the first and second speed ratio drives constituting the low range the coupler 500 is positioned rearwardly as illustrated in Fig. 14. The first speed drive is transmitted through the gears 90, 138, 148 and 150, and the second speed drive is transmitted through the gears 76, 136, 148 and 150. In the high range the coupler 500 is shifted forwardly to engage its dental teeth 504 with the dental teeth 506 carried by the gear 76 of the shaft 72. The third speed drive is transmitted through the gears 90, 138, 126 and 76 to the coupler 500 and the final driven shaft 96, and the fourth speed or direct drive is transmitted from the shaft 72 through the coupler 500 to the final driven shaft 96. In this embodiment the front and rear clutches A and B, and the coupler 500, constituting the high range clutch C, are actuated in timed sequence depending on the fluid pressure developed by the rear pump E influenced by the position of the accelerator pedal 236 in the same manner as the embodiment illustrated in Fig. 1 heretofore described and as illustrated in Figs. 2 and 6 to 12.

If desired an auxiliary control may be provided as illustrated in Fig. 14 to permit the operator to shift the coupler 500 forwardly to engage the high range gearing at will. One illustrative example of such a coupler shifting mechanism includes an arm 536 secured to a shaft 538 and having a contoured end 540 to engage a washer 542 clamped to the rod 518 between the sleeve 534 and a nut 544 to shift the coupler 500 forwardly. The shaft 538 may be actuated in any convenient manner by a lever or pedal operably connected thereto and accessible to the operator.

It will be understood that various forms of the invention other than those described above may be used without departing from the spirit or scope of the invention.

I claim:

1. In a transmission for an accelerator pedal controlled engine, driving and driven shafts, front and rear pumps driven by the driving and driven shafts respectively, gear means between the driving and driven shafts to provide a plurality of different speed ratio drives, a plurality of successively operable clutches to engage said different speed ratio drives, a master valve mechanism including a cylinder connected with the rear pump and having spaced successively higher speed ratio ports, clutch selector valve means, connecting means between the selector valve means and said clutches, a kickdown valve mechanism comprising a cylinder having passages interconnecting the master cylinder and the rear pump and interconnecting the front pump and the selector valves, a sleeve slidably mounted in the cylinder between normal and kickdown positions and having passages to interconnect the master cylinder and the rear pump when the sleeve is in the normal position and to vent the master cylinder when the sleeve is in the kickdown position, a plunger slidably mounted in the sleeve, accelerator pedal actuated means controlling the plunger, and means to vent the passages interconnecting the front pump and the selector valves when said sleeve is in the normal position and the plunger is in the accelerator released position and to directly interconnect the front pump with said selector valves when the sleeve is in the kickdown position.

2. In a control mechanism for an accelerator pedal controlled engine driven transmission having driving and driven shafts, a source of fluid pressure, successively operable fluid pressure actuated clutches interposed between the driving and driven shafts to provide a plurality of different speed ratio drives, a kickdown valve mechanism comprising a cylinder having relatively movable sleeve and plunger members, the sleeve being movable in the cylinder between normal and kickdown positions and the plunger being movable in the sleeve in response to speed varying movement of the accelerator pedal, fluid directing means operable when the sleeve is in the normal position to engage one of said clutches to provide a direct drive between the driving and driven shafts and operable when the sleeve is in the kickdown position to disengage said one clutch and engage another of said clutches to transmit power from the driving shaft to the driven shaft in an underdriven speed ratio, means carried by the plunger to shift the sleeve to the kickdown position when the accelerator is moved beyond the speed increasing position, means associated with the plunger to return the sleeve to the normal position when the accelerator is released, means operable independently of said plunger to shift the sleeve to the kickdown position, and manually operable means separate from the accelerator pedal to actuate said independently operable means.

3. In a motor vehicle having an accelerator pedal controlled engine and a transmission having driving and driven shafts, front and rear pumps driven by the driving and driven shafts respectively, gear means between the driving and driven shafts to provide a plurality of different speed ratio drives, a plurality of successively operable clutches to engage said different speed ratio drives, the combination of a control mechanism having a master valve mechanism including a cylinder connected with the rear pump and having spaced successively higher speed ratio ports, a piston slidably mounted in the cylinder, yielding means urging the piston to close said ports, means operated by speed increasing movement of the accelerator pedal to increase the force exerted on the piston by the yielding means, clutch selector valve means including cylinders having pistons slidably mounted therein, connecting means between the cylinders of the selector valves and said clutches, connecting means between said selector valve cylinders and the front pump, connecting means between the spaced ports of the master cylinder and the cylinders of the selector valves to subject said pistons to rear pump pressure to successively shift said pistons to transmit fluid pressure from the front pump to engage said clutches, yielding means urging said clutch selector pistons toward clutch disengaging positions, a kickdown valve mechanism comprising a cylinder having passages interconnecting the master cylinder and the rear pump and interconnecting the front pump and the selector valves, a sleeve slidably mounted in the cylinder between normal and kickdown positions and having passages to interconnect the master cylinder and the rear pump when the sleeve is in the normal position and to vent the master cylinder when the sleeve is in the kickdown position, a plunger slidably mounted in the sleeve, accelerator pedal actuated means controlling the plunger, and means to vent the passages interconnecting the front pump and the selector valves when said sleeve is in the normal position and the plunger is in the accelerator released position and to directly interconnect the front pump with said selector valves when the sleeve is in the kickdown position.

4. In a control mechanism for an accelerator pedal controlled engine driven transmission having driving and driven shafts, front and rear pumps driven by the driving and driven shafts respectively, gear means between the driving and driven shafts to provide a plurality of different speed ratio drives, a plurality of successively operable fluid pressure actuated clutches to engage said different speed ratio drives, fluid pressure operated clutch selector means, a kickdown valve mechanism comprising a cylinder having passages interconnecting the front pump and said fluid pressure actuated clutches and interconnecting the rear pump and said fluid pressure operated clutch selector means, a sleeve slidably mounted in the cylinder between normal and kickdown positions and having passages to interconnect the clutch selector means and the rear pump when the sleeve is in the normal position and to vent the master cylinder when the sleeve is in the kickdown position, a plunger slidably mounted in the sleeve, accelerator pedal actuated means controlling the plunger, and means to vent the passages interconnecting the front pump and the selector valves when said sleeve is in the normal position and the plunger is in the accelerator released position and to directly interconnect the front pump with said selector valves when the sleeve is in the kickdown position.

5. A control mechanism for a transmission driven by an accelerator pedal controlled engine and having driving and driven shafts and a plurality of successively operable clutches to engage different speed ratio drives, a source of fluid pressure, a master valve mechanism including a cylinder adapted to be subjected to fluid pressure, and having spaced successively higher speed ratio ports, a piston slidably mounted in the cylinder, yielding means urging the piston to close said ports, means operated by speed increasing movement of the accelerator pedal to increase the force exerted on the piston by the yielding means, clutch selector means including a cylinder having a ported piston slidably mounted therein that is operative to effect an engagement of one of said spaced clutches, clutch selector actuating means including a cylinder having pistons slidably mounted therein, connecting means between the selector means and said clutches, means to subject the selector valves to fluid pressure, connecting means between the spaced ports of the master cylinder and the selector valves to engage said clutches, yielding means urging said clutch selector pistons toward clutch disengaging positions, and connecting means between the clutch selector means and the clutch selector actuating means.

6. In a transmission for an accelerator pedal controlled engine, a driving shaft, a driven shaft, front and rear pumps driven by the driving and driven shafts respectively, gear means between the driving and driven shafts to provide a plurality of different speed ratio drives, a plurality of successively operable clutches to engage said different speed ratio drives, the combination of a control mechanism having a master valve mechanism including a cylinder connected with the rear pump and having spaced successively higher speed ratio ports, a piston slidably mounted in the cylinder, yielding means urging the piston to close said ports, means operated by speed increasing movement of the accelerator pedal to increase the force exerted on the piston by the yielding means, clutch selector valve means including cylinders having pistons slidably mounted therein, yielding means urging said pistons towards clutch disengaging positions, connecting means between the cylinders of the selector valves and said clutches, connecting means between said selector valve cylinders and the front pump, connecting means between the spaced ports of the master cylinder and the cylinders of the selector valves to subject said pistons to rear pump pressure to successively shift said pistons to transmit fluid pressure from the front pump to engage said clutches, fluid pressure responsive means operated by front pump pressure upon engagement of the highest speed ratio clutch to actuate one of said other selector valve means to render inoperative a lower speed ratio clutch, a kickdown valve mechanism comprising a cylinder having passages interconnecting the master cylinder and the rear pump and interconnecting the front pump and the selector valves, a sleeve slidably mounted in the cylinder between normal and kickdown positions and having passages to interconnect the master cylinder and the rear pump when the sleeve is in the normal position and to vent the master cylinder when the sleeve is in the kickdown position, a plunger slidably mounted in the sleeve, accelerator pedal actuated means controlling the plunger, means to vent the passages interconnecting the front pump and the selector valves when said sleeve is in the normal position and the plunger is in the accelerator released position and to directly interconnect the front pump with said selector valves when the sleeve is in the kickdown position, connecting means operable when the sleeve is in the kickdown position and the master valve is vented to direct rear pump fluid pressure to the cylinder of one of said selector valves to engage an underdriven speed ratio clutch, means carried by the plunger to shift the sleeve to the kickdown position when the accelerator is moved beyond the speed increasing position, means carried by the plunger to shift the sleeve to the normal position when the accelerator is released, means operable independently of said plunger to shift the sleeve to the kickdown position, and manually operable means separate from the accelerator pedal to actuate said independently operable means.

7. In a transmission for an accelerator pedal controlled engine, a driving shaft, a driven shaft, front and rear pumps driven by the driving and driven shafts respectively, gear means between the driving and driven shafts to provide a plurality of different speed ratio drives, a plurality of successively operable clutches to engage said different speed ratio drives, a master valve, clutch selector valve means, a kickdown valve mechanism comprising a cylinder having passages interconnecting the master valve and the rear pump and interconnecting the front pump and the clutch selector valve means, a sleeve slidably mounted in the cylinder and movable between normal and kickdown positions and having passages to interconnect the master valve and the rear pump when the sleeve is in the normal position and to vent the master valve when the sleeve is in the kickdown position, a plunger slidably mounted in the sleeve, accelerator pedal actuated means controlling the plunger, means to vent the passages interconnecting the front pump and the clutch selector valve means when said sleeve is in the normal position and the plunger is in the accelerator released position and to directly interconnect the front pump with said clutch selector valve means when the sleeve is in the kickdown position, connecting means operable when the sleeve is in the kickdown position and the master valve is vented to direct rear pump fluid pressure to the clutch selector valve means to engage an underdriven speed ratio clutch, means carried by the plunger to shift the sleeve to the kickdown position when the accelerator is moved beyond the speed increasing position, means carried by the plunger to shift the sleeve to the normal position when the accelerator is released, means operable independently of said plunger to shift the sleeve to the kickdown position, and manually operable means separate from the accelerator pedal to actuate said independently operable means.

8. In a control mechanism for an accelerator pedal controlled engine driven transmission having driving and driven shafts, front and rear pumps driven by the driving and driven shafts respectively, successively operable fluid pressure actuated clutches interposed between the driving and driven shafts to provide a plurality of different speed ratio drives including a direct drive, fluid pressure operated means supplied by fluid pressure from the front pump for engaging said clutches, fluid pressure operated means supplied by fluid pressure from the rear pump and influenced by accelerator pedal position for controlling the time of engagement of said clutches, a kickdown valve mechanism comprising a cylinder having relatively movable sleeve and plunger members, the sleeve being movable in the cylinder between normal and kickdown positions and the plunger being movable in the sleeve in response to speed varying movement of the accelerator pedal, fluid directing means operable when the sleeve is in the normal position to engage one of said clutches to provide a direct drive between the driving and driven shafts and operable when the sleeve is in the kickdown position to disengage said one of the clutches and engage another of said clutches to transmit power from the driving shaft to the driven shaft in an underdriven speed ratio, means carried by the plunger to shift the sleeve to the kickdown position when the accelerator pedal is moved beyond the speed increasing position, means associated with the plunger to return the sleeve to the normal position when the accelerator is released, means operable independently of said plunger to shift the sleeve to the kickdown position, manually operable means separate from the accelerator pedal to actuate said independently operable means, and a check valve interposed between the rear pump fluid circuit and the front pump fluid circuit to admit fluid under pressure from the rear pump circuit to the front pump circuit to engage certain of said clutches to permit cranking the engine in an underdriven speed ratio when the vehicle is pushed or pulled while the engine is not running.

9. In a control mechanism for an accelerator pedal controlled engine driven transmission having driving and driven shafts, front and rear pumps driven by the driving and driven shafts respectively, alternately operating fluid pressure actuated clutches driven by the driving shaft, low and high range gearing between said clutches and the driven shaft, range controlling mechanism controlling said low and high range gearing, fluid pressure operated means for actuating the range controlling mechanism, a master valve including a cylinder connected with the rear pump and having spaced successively higher speed ratio ports, a piston slidably mounted in the cylinder, yielding means urging the piston to close said ports, and means operated by speed increasing movement of the accelerator pedal to increase the force exerted on the piston by the yielding means.

10. In a control mechanism for an accelerator pedal controlled engine driven transmission having driving and driven shafts, front and rear pumps driven by the driving and driven shafts respectively, alternately operating fluid pressure actuated clutches driven by the driving shaft, low and high range gearing between said clutches and the driven shaft, range controlling mechanism controlling said low and high range gearing, fluid pressure operated means for actuating the range controlling mechanism, fluid pressure operated clutch selector means, a kickdown valve mechanism comprising a cylinder having passages interconnecting the front pump and said fluid pressure actuated clutches and interconnecting the rear pump and said fluid pressure operated clutch selector means, a sleeve slidably mounted in the cylinder and movable between normal and kickdown positions and having passages to interconnect the clutch selector means and the rear pump when the sleeve is in the normal position and to vent the master cylinder when the sleeve is in the kickdown position, a plunger slidably mounted in the sleeve, accelerator pedal actuated means controlling the plunger, and means to vent the passages interconnecting the front pump and the selector valves when said sleeve is in the normal position and the plunger is in the accelecator released position and to directly interconnect the front pump with said selector valves when the sleeve is in the kickdown position.

11. In a transmission for an accelerator pedal controlled engine, a driving shaft, a driven shaft, front and rear pumps driven by the driving and driven shafts respectively, means including alternately operating friction clutches providing two different speed ratio drives between the driving and the driven shaft, a third clutch between one of said alternately operating clutches and the driven shaft adapted when engaged to transmit power from said clutches to the driven shaft at different speed ratios than when said third clutch is not engaged, a control mechanism comprising a master valve including a cylinder connected with the rear pump and having spaced successively higher speed ratio ports, a piston slidably mounted in the cylinder, yielding means urging the piston to close said ports, means operated by speed increasing movement of the accelerator pedal to increase the force exerted on the piston by the yielding means, clutch selector valve means including cylinders having pistons slidably mounted therein, yielding means urging said pistons towards clutch disengaging positions, connecting means between the selector valves and said clutches, connecting means between said selector valves and the front pump, connecting means between the spaced ports of the master cylinder and the selector valves to successively shift said pistons to transmit fluid pressure from the front pump to engage said clutches, and fluid pressure responsive means operated by front pump pressure upon engagement of said third clutch to actuate one of said other selector valve means to render inoperative one of the alternately operating clutches.

12. In a transmission for an accelerator pedal controlled engine, a driving shaft, a driven shaft, front and rear pumps driven by the driving and driven shafts respectively, means including alternately operating friction clutches providing two different speed ratio drives between the driving and the driven shaft, a third clutch between one of said alternately operating clutches and the driven shaft adapted when engaged to transmit power from said clutches to the driven shaft at different speed ratios than when said third clutch is not engaged, a control mechanism comprising a master valve including a cylinder connected with the rear pump and having spaced successively higher speed ratio ports, a piston slidably mounted in the cylinder, yielding means urging the piston to close said ports, means operated by speed increasing movement of the accelerator pedal to increase the force exerted on the piston by the yielding means, clutch selector valve means including cylinders having pistons slidably mounted therein, yielding means urging said pistons toward clutch disengaging positions, connecting means between the selector valves and said clutches, connecting means between said selector valves and the front pump, connecting means between the spaced ports of the master cylinder and the selector valves to successively shift said pistons to transmit fluid pressure from the front pump to engage said clutches, fluid pressure responsive means operated by front pump pressure upon engagement of said third clutch to actuate one of said other selector valve means to render inoperative one of the alternately operating clutches, a kickdown valve mechanism comprising a cylinder having passages interconnecting the master cylinder and the rear pump and interconnecting the front pump and the selector valves, a sleeve slidably mounted in the cylinder between normal and kickdown positions and having passages to interconnect the master cylinder and the rear pump when the sleeve is in the normal position and to vent the master cylinder when the sleeve is in the kickdown position, a plunger slidably mounted in the sleeve, accelerator pedal actuated means controlling the plunger, means to vent the passages interconnecting the front pump and the selector valves when said sleeve is in the normal position and the plunger is in the accelerator released position and to directly interconnect the front pump with said selector valves when the sleeve is in the kickdown position, connecting means operable when the sleeve is in the kickdown position and the master valve is vented to direct rear pump fluid pressure to the cylinder of one of said selector valves to engage an underdriven speed ratio clutch, means carried by the plunger to shift the sleeve to the kickdown position when the accelerator is moved beyond the speed increasing position, means carried by the plunger to shift the sleeve to the normal position when the accelerator is released, means operable independently of said plunger to shift the sleeve to the kickdown position, and manually operable means separate from the accelerator pedal to actuate said independently operable means.

13. In a control mechanism for an accelerator pedal controlled engine driven transmission having driving and driven shafts, front and rear pumps driven by the driving and driven shafts respectively, alternately operating fluid pressure actuated clutches driven by the driving shaft, low and high range gearing between said clutches and the driven shaft, range controlling mechanism controlling said low and high range gearing, fluid pressure operated means for actuating the range controlling mechanism, a master valve including a cylinder connected with the rear pump and having spaced successively higher speed ratio ports, a piston slidably mounted in the cylinder, yielding means urging the piston to close said ports, means operated by speed increasing movement of the accelerator pedal to increase the force exerted on the piston by the yielding means, a kickdown valve mechanism comprising a cylinder including relatively movable sleeve and plunger members having passages to direct fluid pressure from the front pump to actuate said clutches and range controlling mechanism and passages to direct fluid pressure from the rear pump to control the engagement of said clutches and range controlling mechanism, accelerator pedal actuated means controlling the plunger, means to vent said passages from the front pump when said sleeve is in the normal position and the plunger is in the accelerator released position and to interconnect the front pump with said clutches and range controlling mechanism when the sleeve is in the kickdown position, connecting means operable when the sleeve is in the kickdown position to direct rear pump fluid pressure to disengage one of said alternately operating clutches and engage the other to transmit power in an underdriven speed ratio, means carried by the plunger to shift the sleeve to the kickdown position when the accelerator is moved beyond the speed increasing position, and means associated with the plunger to return the sleeve to the normal position when the accelerator is released.

14. In a control mechanism for an accelerator pedal controlled engine driven transmission having driving and driven shafts, a source of fluid pressure, alternately operating fluid pressure actuated clutches driven by the driving shaft, low and high range gearing between said clutches and the driven shaft, range controlling mechanism for engaging the high range gearing, fluid pressure operated means for actuating the range controlling mechanism, a kickdown valve mechanism comprising a cylinder having relatively movable sleeve and plunger members, the sleeve being movable in the cylinder between normal and kickdown positions and the plunger being movable in the sleeve in response to speed varying movement of the accelerator pedal, fluid directing means operable when the sleeve is in the normal position to engage said range controlling mechanism and one of said alternately operating clutches to provide a direct drive between the driving and driven shafts and operable when the sleeve is in the kickdown position to disengage said one of the alternately operating clutches and engage the other of said clutches to transmit power from the driving shaft to the driven shaft in an underdriven speed ratio, means carried by the plunger to shift the sleeve to the kickdown position when the accelerator is moved beyond the speed increasing position, means associated with the plunger to return the sleeve to the normal position when the accelerator is released, means operable independently of said plunger to shift the sleeve to the kickdown position, and manually operable means separate from the accelerator pedal to actuate said independently operable means.

15. In a control mechanism for an accelerator pedal controlled engine driven transmission having driving and driven shafts, front and rear pumps driven by the driving and driven shafts respectively, alternately operating fluid pressure actuated clutches driven by the driving shaft, low and high range gearing between said clutches and the driven shaft, range controlling mechanism controlling said low and high range gearing, fluid pressure operated means for actuating the range controlling mechanism, a kickdown valve mechanism comprising a cylinder including relatively movable sleeve and plunger members having passages to direct fluid pressure from the front pump to actuate said clutches and range controlling mechanism and passages to direct fluid pressure from the rear pump to control the engagement of said clutches and range controlling mechanism, accelerator pedal actuated means controlling the plunger, means to vent said passages from the front pump when said sleeve is in the normal position and the plunger is in the accelerator released position and to interconnect the front pump with said clutches and range controlling mechanism when the sleeve is in the kickdown position, connecting means operable when the sleeve is in the kickdown position to direct rear pump fluid pressure to disengage one of said alternately operating clutches and engage the other to transmit power in an underdriven speed ratio, means carried by the plunger to shift the sleeve to the kickdown position when the accelerator is moved beyond the speed increasing position, and means associated with the plunger to return the sleeve to the normal position when the accelerator is released.

16. In a control mechanism for an accelerator pedal controlled engine driven transmission having driving and driven shafts, front and rear pumps driven by the driving and driven shafts respectively, alternately operating fluid pressure actuated clutches driven by the driving shaft, low and high range gearing between said clutches and the driven shaft, range controlling mechanism controlling said low and high range gearing, fluid pressure operated means for actuating the range controlling mechanism, the combination of a control mechanism having a master valve mechanism including a cylinder connected with the rear pump and having spaced successively higher speed ratio ports, a piston slidably mounted in the cylinder, yielding means urging the piston to close said ports, means operated by speed increasing movement of the accelerator pedal to increase the force exerted on the piston by the yielding means, clutch and range controlling selector valve means including cylinders having pistons slidably mounted therein, yielding means urging said pistons towards clutch disengaging positions, connecting means between the cylinders of the selector valves and said clutches and range controlling fluid pressure operated mechanism, connecting means between said selector valve cylinders and the front pump, connecting means between the spaced ports of the master cylinder and the cylinders of the selector valves to subject said pistons to rear pump pressure to successively shift said pistons to transmit fluid pressure from the front pump to engage said clutches and range controlling and fluid pressure operated means, fluid pressure responsive means operated by front pump pressure upon engagement of the range controlling mechanism to actuate one of said other selector valve means to render one of said alternately operating clutches inoperative, a kickdown valve mechanism comprising a cylinder having passages interconnecting the master cylinder and the rear pump and interconnecting the front pump and the selector valves, a sleeve slidably mounted in the cylinder and movable between normal and kickdown positions and having passages to interconnect the master cylinder and the rear pump when the sleeve is in the normal position and to vent the master cylinder when the sleeve is in the kickdown position, a plunger slidably mounted in the sleeve, accelerator pedal actuated means controlling the plunger, means to vent the passages interconnecting the front pump and the selector valves when said sleeve is in the normal position and the plunger is in the accelerator released position and to directly interconnect the front pump with said selector valves when the sleeve is in the kickdown position, connecting means operable when the sleeve is in the kickdown position and the master valve is vented to direct rear pump fluid pressure to the cylinder of one of said selector valves to engage an underdriven speed ratio clutch, means carried by the plunger to shift the sleeve to the kickdown position when the accelerator is moved beyond the speed increasing position, means carried by the plunger to shift the sleeve to the normal position when the accelerator is released, means operable independently of said plunger to shift the sleeve to the kickdown position, and manually operable means separate from the accelerator pedal to actuate said independently operable means.

17. In a control mechanism for an accelerator pedal controlled engine driven transmission having driving and driven shafts, front and rear pumps driven by the driving and driven shafts respectively, alternately operating fluid pressure actuated clutches driven by the driving shaft, low and high range gearing between said clutches and the driven shaft, range controlling mechanism for engaging the high range gearing, fluid pressure operated means supplied by fluid pressure from the front pump for actuating the range controlling mechanism and engaging said clutches, fluid pressure operated means supplied by fluid pressure from the rear pump and influenced by accelerator pedal position for controlling the sequence of engagement of said clutches, a kickdown valve mechanism comprising a cylinder having relatively movable sleeve and plunger members, the sleeve being movable in the cylinder between normal and kickdown positions and the plunger being movable in the sleeve in response to speed varying movement of the accelerator pedal, fluid directing means operable when the sleeve is in the normal position to engage said range controlling mechanism and one of said alternately operating clutches to provide a direct drive between the driving and driven shafts and operable when the sleeve is in the kickdown position to disengage said one of the alternately operating clutches and engage the other of said clutches to transmit power from the driving shaft to the driven shaft in an underdriven speed ratio, means carried by the plunger to shift the sleeve to the kickdown position when the accelerator is moved beyond the speed increasing position, means associated with the plunger to return the sleeve to the normal position when the accelerator is released, means operable independently of said plunger to shift the sleeve to the kickdown position, manually operable means separate from the accelerator pedal to actuate said independently operable means, and a check valve interposed between the rear pump fluid circuit and the front pump fluid circuit to admit fluid under pressure from the rear pump circuit to the front pump circuit to engage certain of said clutches to permit cranking the engine in an underdriven speed ratio when the vehicle is pushed or pulled while the engine is not running.

18. In a control mechanism for an accelerator pedal controlled engine driven transmission having driving and driven shafts, front and rear pumps driven by the driving and driven shafts respectively, alternately operable fluid pressure actuated clutches and a fluid pressure actuated coupler interposed between the driving and driven shafts to successively provide low and high range drives, each range having a plurality of different speed ratio drives, a kickdown valve mechanism comprising a cylinder having relatively movable sleeve and plunger members, the sleeve being movable in the cylinder between normal and kickdown positions and the plunger being movable in the sleeve in response to speed varying movement of the accelerator pedal, fluid directing means operable when the sleeve is in the normal position to engage one of said clutches with the coupler in the high range position to provide a direct drive between the driving and driven shafts and operable when the sleeve is in the kickdown position to disengage said one clutch and engage another of said clutches with the coupler retained in the high range position to transmit power from the driving shaft to the driven shaft in an underdriven speed ratio, means carried by the plunger to shift the sleeve to the kickdown position when the accelerator is moved beyond the speed increasing position, means associated with the plunger to return the sleeve to the normal position when the accelerator is released, means operable independently of said plunger to shift the sleeve to the kickdown position, and manually operable means separate from the accelerator pedal to actuate said independently operable means.

19. In a control mechanism for an accelerator pedal controlled engine driven transmission having driving and driven shafts, front and rear pumps driven by the driving and driven shafts respectively, alternately operating fluid pressure actuated clutches driven by the driving shaft, low and high range gearing between said clutches and the driven shaft, range controlling mechanism including an axially shiftable coupler controlling said low and high range gearing, fluid pressure operated means for actuating the range controlling mechanism, a master valve including a cylinder connected with the rear pump and having spaced successively higher speed ratio ports, a piston slidably mounted in the cylinder, yielding means urging the piston to close said ports, means operated by speed increasing movement of the accelerator pedal to increase the force exerted on the piston by the yielding means, a kickdown valve mechanism comprising a cylinder including relatively movable sleeve and plunger members having passages to direct fluid pressure from the front pump to actuate said clutches and range controlling mechanism and passages to direct fluid pressure from the rear pump to control the engagement of said clutches and range controlling mechanism, accelerator pedal actuated means controlling the plunger, means to vent said passages from the front pump when said sleeve is in the normal position and the plunger is in the accelerator released position and to interconnect the front pump with said clutches and range controlling mechanism when the sleeve is in the kickdown position, connecting means operable when the sleeve is in the kickdown position to direct rear pump fluid pressure to disengage one of said alternately operating clutches and engage the other to transmit power in an underdriven speed ratio, means carried by the plunger to shift the sleeve to the kickdown position when the accelerator is moved beyond the speed increasing position, and means associated with the plunger to return the sleeve to the normal position when the accelerator is released.

20. In a transmission for an accelerator pedal controlled engine, a driving shaft, a driven shaft, front and rear pumps driven by the driving and driven shafts respectively, gear means between the driving and driven shafts to provide a plurality of different speed ratio drives, a plurality of successively operable clutches including a coupler movable between low and high range positions to engage said different speed ratio drives, a master valve, clutch selector valve means, a kickdown valve mechanism comprising a cylinder having passages interconnecting the master valve and the rear pump and interconnecting the front pump and the clutch selector valve means, a sleeve slidably mounted in the cylinder and movable between normal and kickdown positions and having passages to interconnect the master valve and the rear pump when the sleeve is in the normal position and to vent the master valve when the sleeve is in the kickdown position, a plunger slidably mounted in the sleeve, accelerator pedal actuated means controlling the plunger, means to vent the passages interconnecting the front pump and the clutch selector valve means when said sleeve is in the normal position and the plunger is in the accelerator released position and to directly interconnect the front pump with said clutch selector valve means when the sleeve is in the kickdown position, connecting means operable when the sleeve is in the kickdown position and the master valve is vented to direct rear pump fluid pressure to the clutch selector valve means to engage an underdriven speed ratio clutch, means carried by the plunger to shift the sleeve to the kickdown position when the accelerator is moved beyond the speed increasing position, means carried by the plunger to shift the sleeve to the normal position when the accelerator is released, means operable independently of said plunger to shift the sleeve to the kickdown position, and manually operable means separate from the accelerator pedal to actuate said independently operable means.

JESSE G. VINCENT.

References Cited in the file of this patent

UNITED STATES PATENTS

| Number | Name | Date |
| --- | --- | --- |
| 1,941,089 | Hellman | Dec. 26, 1933 |
| 2,100,810 | Livermore | Nov. 30, 1937 |
| 2,102,781 | Bieretz | Dec. 21, 1937 |
| 2,177,151 | Ross | Oct. 24, 1939 |
| 2,204,872 | Thompson | June 18, 1940 |
| 2,223,716 | Bojesen | Dec. 3, 1940 |
| 2,328,273 | Hale | Aug. 31, 1943 |
| 2,332,593 | Nutt et al. | Oct. 26, 1943 |
| 2,516,203 | Greenlee et al. | July 25, 1950 |
| 2,516,208 | Hasbany | July 25, 1950 |
| 2,567,042 | Wemp | Sept. 4, 1951 |